United States Patent
Ogawa et al.

(10) Patent No.: US 8,634,136 B2
(45) Date of Patent: Jan. 21, 2014

(54) TRANSMISSION SCREEN FOR INTERACTIVE BOARD

(75) Inventors: Kazunobu Ogawa, Mihara (JP); Takeshi Ogawa, Fukuyama (JP); Kenji Ohki, Higashihiroshima (JP); Tetsuya Sadahiro, Mihara (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/055,584

(22) PCT Filed: Mar. 25, 2010

(86) PCT No.: PCT/JP2010/055219
§ 371 (c)(1),
(2), (4) Date: Jan. 24, 2011

(87) PCT Pub. No.: WO2010/110369
PCT Pub. Date: Sep. 30, 2010

(65) Prior Publication Data
US 2011/0122493 A1    May 26, 2011

(30) Foreign Application Priority Data

Mar. 26, 2009 (JP) ................................. 2009-076222
Aug. 28, 2009 (JP) ................................. 2009-198050
Oct. 29, 2009 (JP) ................................. 2009-248670

(51) Int. Cl.
*G03B 21/56* (2006.01)
(52) U.S. Cl.
USPC .......................................... 359/457; 359/443
(58) Field of Classification Search
USPC ................................................ 359/443–461
See application file for complete search history.

(56) References Cited

U.S. PATENT DOCUMENTS

| | | | |
|---|---|---|---|
| 6,822,792 B2 | 11/2004 | Goto | |
| 2002/0167725 A1 | 11/2002 | Goto | |
| 2004/0240055 A1* | 12/2004 | Teramoto et al. | 359/457 |
| 2004/0252284 A1 | 12/2004 | Suzuki et al. | |
| 2005/0041287 A1* | 2/2005 | Goto | 359/456 |
| 2007/0058228 A1 | 3/2007 | Suzuki et al. | |
| 2007/0177263 A1* | 8/2007 | Ono | 359/457 |
| 2011/0298993 A1* | 12/2011 | Hirata et al. | 348/744 |

FOREIGN PATENT DOCUMENTS

| | | | | |
|---|---|---|---|---|
| EP | 2 026 571 A2 | | 2/2009 | |
| JP | 1989-224736 | * | 7/1989 | G03B 21/62 |
| JP | 224736 | * | 7/1989 | G02B 21/62 |
| JP | 01-224736 A1 | | 9/1989 | |

(Continued)

OTHER PUBLICATIONS

Japanese Office Action (Application No. 2010-070752) dated Nov. 15, 2013 (with English translation).

*Primary Examiner* — Clayton E Laballe
*Assistant Examiner* — Kevin Butler
(74) *Attorney, Agent, or Firm* — Burr & Brown, PLLC

(57) ABSTRACT

There is provided a screen that, as a screen suitable for an interactive board, can output video image light incident obliquely from the back surface side to a viewer side to display a reflection-free image and, at the same time, can realize easy handwriting on the screen surface on the viewer side. To this end, a transmission screen for an interactive board is provided that comprises at least a Fresnel lens sheet comprising a prism part on its incident light side, a light diffusing member provided on the Fresnel lens on its surface side remote from the prism part, and a hard coat layer provided on the outgoing light side of the light diffusing member.

26 Claims, 17 Drawing Sheets

(56) References Cited

FOREIGN PATENT DOCUMENTS

| | | | |
|---|---|---|---|
| JP | 02-094863 A1 | 4/1990 | |
| JP | 3093288 U1 | 2/2003 | |
| JP | 2003-149744 A1 | 5/2003 | |
| JP | 2003-276339 A1 | 9/2003 | |
| JP | 2004-004148 A1 | 1/2004 | |
| JP | 2004-70188 * | 3/2004 | ............... G02B 3/08 |
| JP | 2004-070188 A1 | 3/2004 | |
| JP | 2005-010730 A1 | 1/2005 | |
| JP | 2006-065185 A1 | 3/2006 | |
| JP | 2006-178041 A1 | 7/2006 | |
| JP | 2006-259028 A1 | 9/2006 | |
| JP | 2007-233154 A1 | 9/2007 | |
| JP | 2007-293172 A1 | 11/2007 | |
| JP | 293172 * | 11/2007 | ............. G02B 21/62 |
| JP | 2007-316415 A1 | 12/2007 | |
| JP | 2008-250158 A1 | 10/2008 | |
| JP | 2009-042454 A1 | 2/2009 | |

\* cited by examiner

TRANSMISSION SCREEN FOR INTERACTIVE BOARD

FIELD OF INVENTION

The present invention relates to a transmission screen for an interactive board. More specifically, the present invention relates to a transmission screen for an interactive board that, even in a large screen, can realize short focus projection and a thickness reduction.

BACKGROUND OF THE INVENTION

In recent years, electronic blackboards called interactive boards have become used that can allow letters or figures, written on a board, as such to be input in a personal computers, or conversely, image information stored in the personal computer to be projected on the board. For example, Japanese Registered Utility Model No. 3093288 (patent document 1) proposes an interactive board that can allow an image displayed on a personal computer to be projected on a board and can allow handwritten letters or images on the board to be displayed on the personal computer.

In the interactive board as proposed in the above publication, the image from the personal computer is projected from the viewer side of the board, and, thus, the interactive board is disadvantageous in that, in additionally handwriting information such as letters on the board, the projected image is blocked. Further, a space for installing a projector should be provided on the front of the board is necessary.

The above problem can be solved by projecting the image from the back surface of the interactive board (that is, a surface remote the information input surface). For example, Japanese Patent Application Laid-Open No. 276339/2003 (patent document 2) proposes an interactive board in which a projector is provided on the back surface side of the interactive board and an image is projected from the back surface of a light transparent screen. In this publication, however, the interactive board is not specifically shown as a screen that forms an image from light projected from a projector and displays the image.

A transmission screen is known that outputs video image light projected from a light source toward a viewer side to display the image. Various structures have been proposed as the transmission screen. For example, Japanese Patent Application Laid-Open No. 233154/2007 (patent document 3) proposes a transmission screen comprising a combination of a Fresnel lens with a lenticular lens. Further, Japanese Patent Application Laid-Open No. 070188/2004 (patent document 4) proposes a combination of a Fresnel lens utilizing total reflection with a light diffusing sheet for thickness reduction purposes. In these transmission screens, image light is projected from the back surface side remote from the viewer side, and, thus, a space for installing a projector is not required on the viewer side.

PRIOR ART DOCUMENTS

Patent Documents

[Patent document 1] Japanese Utility Model Registration No. 3093288
[Patent document 2] Japanese Patent Application Laid-Open No. 276339/2003
[Patent document 3] Japanese Patent Application Laid-Open No. 233154/2007
[Patent document 4] Japanese Patent Application Laid-Open No. 070188/2004

SUMMARY OF THE INVENTION

Problems to be Solved by the Invention

The transmission screens disclosed in Japanese Patent Application Laid-Open No. 233154/2007 and Japanese Patent Application Laid-Open No. 070188/2004 do not have a function as an interactive board that can allow writing to be carried out on the surface of the board on the viewer side. In order that the transmission screen is utilized as the interactive board, what is required is that image light from the back surface side is output to the viewer side to display a reflection-free image and that writing can easily be directly carried out on a screen surface on the viewer side. Further, from the viewpoint of production cost, the transmission screen should have a structure that can be continuously manufactured.

In the conventional interactive boards, since the image is projected from the viewer side of the board, the conventional interactive boards suffer from problems that, in additionally handwriting information such as letters or the like on the board, the projected image is blocked, and a space for installing a projector should be provided on the front of the board.

The present inventors have found that the adoption of a combination of a light diffusing member with a Fresnel lens as a screen suitable for an interactive board can realize a screen that can output an image light incident obliquely from the back surface side to a viewer side to display a reflection-free image, can realize easy handwriting on the screen surface on the viewer side, and, at the same time, can be continuously manufactured. The present invention has been made based on such finding.

Accordingly, an object of the present invention is to provide a screen that, as a screen suitable for an interactive board, can output an image light incident obliquely from the back surface side to a viewer side to display a reflection-free image, can realize easy handwriting on the screen surface on the viewer side, and, at the same time, has a structure which can be continuously manufactured.

Means for Solving the Problems

According to a first aspect of the present invention, there is provided a transmission screen for an interactive board, the transmission screen comprising at least: a Fresnel lens sheet having a prism part on an incident light side; a light diffusing member provided on the Fresnel lens on its surface side remote from the prism part; and a hard coat layer provided on an outgoing light side of the light diffusing member.

According to a second aspect of the present invention, there is provided a transmission screen, for an interactive board, having a lens part provided on both surfaces of a transparent base material, the transmission screen comprising: a total reflection linear Fresnel lens part comprising prisms that are arranged on an incident light side as one surface of the transparent base material, have a total reflection function, and are arranged next to each other in a vertical direction; a linear prism lens part comprising prisms that are arranged on the transparent base material on its surface side remote from the total reflection linear Fresnel lens part and are arranged next to each other in a direction perpendicular to the direction in which the total reflection linear Fresnel lens part is disposed; a light diffusing member provided on the outgoing light side of the linear prism lens part; and a hard coat layer provided on the outgoing light side of the light diffusing member.

According to another aspect of the present invention, there is provided a method for manufacturing the above transmission screen for an interactive board, the method comprising the steps of:

a) providing a mold for molding the total reflection linear Fresnel lens part comprising prisms that have a total reflection function and are arranged next to each other in a vertical direction:

b) providing a mold for molding the linear prism lens part; and c) continuously supplying a transparent base material into the two molds, supplying an ionizing radiation curable resin into between the transparent base material and the two molds, irradiating the ionizing radiation curable resin with an ionizing radiation to cure the ionizing radiation curable resin, and separating a molded product from the two molds.

According to a further aspect of the present invention, there is provided an interactive board comprising the above transmission screen.

Effect of the Invention

According to the present invention, the use, as an interactive board, of a transmission screen comprising a Fresnel lens sheet having a prism part on its incident light side, a light diffusing member provided on the Fresnel lens on its surface side remote from the prism part, and a hard coat layer provided on an outgoing light side of the light diffusing member can allow image light to be introduced from the back surface side of the board and thus can solve a problem of blocking of the displayed image in writing on the board. Further, since the hard coat layer is disposed on the viewer side, the surface of the board on the viewer side can be rendered smooth. Accordingly, writing on the board by a writing instrument or the like is easy, and, at the same time, written letters, figures and the like can easily be erased.

In the transmission screen for an interactive board in the second aspect of the present invention, a total reflection linear Fresnel lens part and a linear prism lens part are arranged perpendicularly to each other. Further, these lens and a light diffusing member are used in combination, and a hard coat layer is provided on the surface of the light diffusing member on its outgoing light side. By virtue of this construction, a screen can be realized that a reflection-free image can be displayed in the output of image light from the back surface side to the viewer side and, at the same time, handwriting on the surface of the screen on the viewer side can easily be realized. Further, the adoption of a structure comprising a total reflection linear Fresnel lens part and a linear prism lens part which are disposed perpendicularly to each other respectively on the obverse and reverse surfaces of a base material film can realize continuous production of the screen and thus can realize the provision of a transmission screen for an interactive board at low cost. Further, the integration of the linear prism lens part with the light diffusing member results in the integration of the whole transmission screen for an interactive board and can solve problems of the formation of a gap between the linear prism lens part and the light diffusing member and a deterioration in the quality of images such as lowering of resolution and deformation of images as a result of easy deformation of the optical sheet comprising the total reflection linear Fresnel lens part and the linear prism lens part provided respectively on the obverse and reverse surfaces of the transparent base material. In particular, the integration of the transmission screen for an interactive board can easily be realized by flattening at least a part of the front end of the linear prism lens part in a direction parallel to the base material and integrating the flattened part with the light diffusing member.

Further, according to the method for manufacturing a transmission screen for an interactive board according to the present invention, the transmission screen can be continuously manufactured, contributing to a reduction in production cost and the like.

In the present invention, when the above transmission screen is applied to an interactive board, the interactive board can realize excellent image quality.

DETAILED DESCRIPTION OF THE INVENTION

<Transmission Screen for Interactive Board in First Embodiment>

Figure 1:
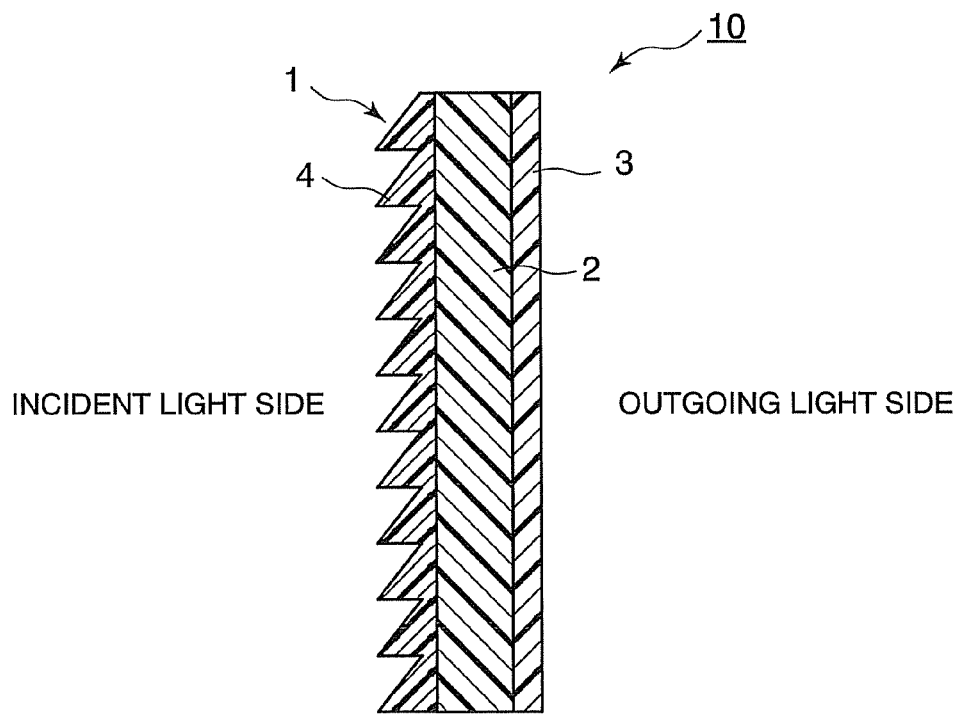
FIG. 1 is a cross-sectional view of one embodiment of a transmission screen for an interactive board according to the present invention.

As shown in FIG. 1, the transmission screen for an interactive prism part in a first embodiment of the present invention comprises at least a Fresnel lens sheet 1 having a prism part 4 on its incident light side, a light diffusing member 2 provided on the Fresnel lens 1 on its surface side remote from the prism part 4, and a hard coat layer 3 provided on the light diffusing member 2 on its outgoing light side. In this transmission screen, image light is applied from the back surface side of the screen (board) and is output from the front surface of the screen. Thus, when the transmission screen is applied to an interactive board, image light can be introduced from the back surface side of the board and, consequently, blocking of a displayed image in writing on the board can be prevented.

Figure 2:
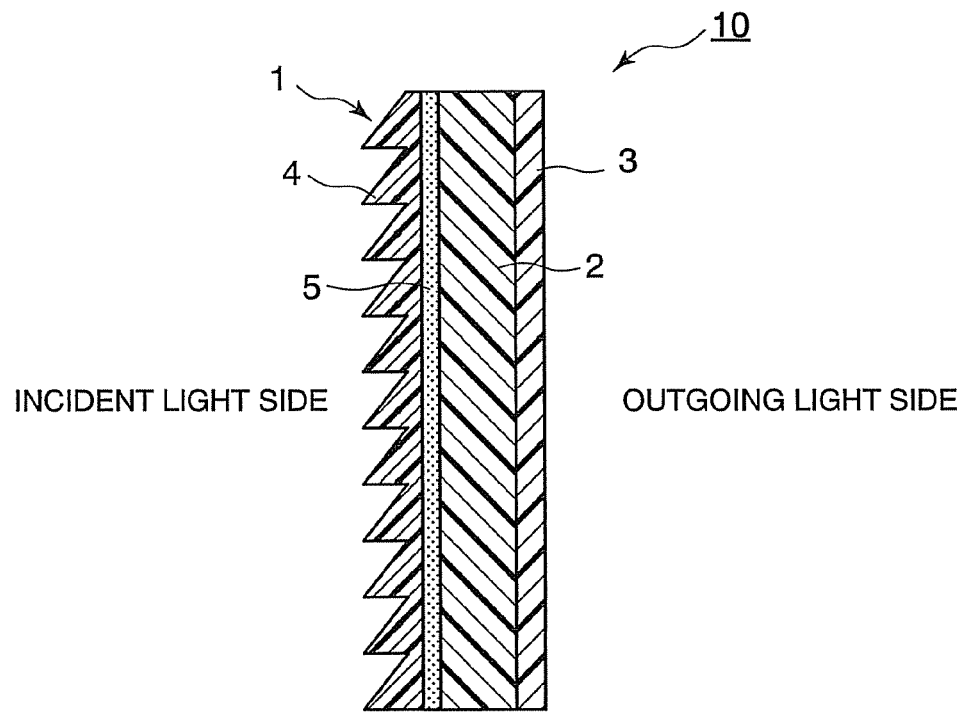
FIG. 2 is a cross-sectional view of another embodiment of a transmission screen for an interactive board according to the present invention.
Figure 3:
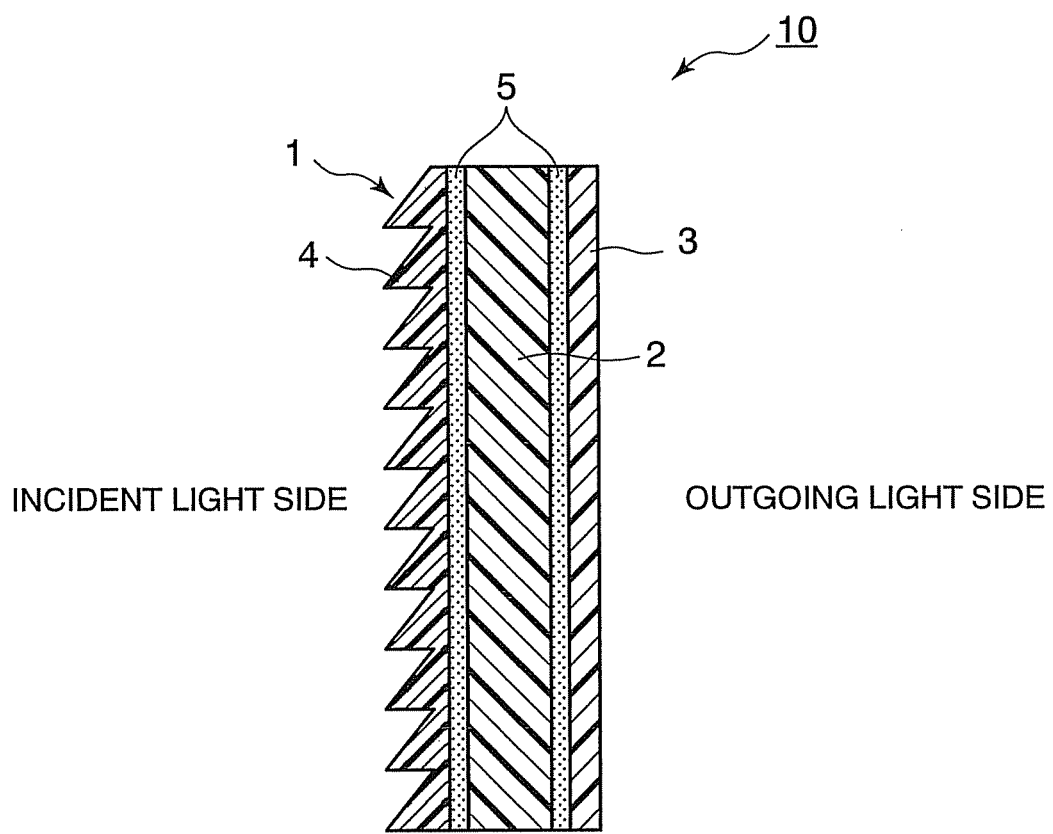
FIG. 3 is a cross-sectional view of a further embodiment of a transmission screen for an interactive board according to the present invention.

As shown in FIG. 1, the Fresnel lens sheet 1 may be provided directly on one surface of the light diffusing member 2. Alternatively, as shown in FIG. 2, the Fresnel lens sheet 1 and the light diffusing member 2 may be laminated onto each other through an adhesive layer 5. Further, as shown in FIG. 1, the hard coat layer 3 may be provided directly on one surface of the light diffusing member 2. Alternatively, as shown in FIG. 3, the light diffusing member 2 and the hard coat layer 3 may be laminated onto each other through an adhesive layer 5.

Individual members constituting the transmission screen for an interactive board in the first embodiment of the present invention will be described.

<Fresnel Lens Sheet>

The Fresnel lens sheet functions to convert image light applied from a projector to light substantially parallel to the surface of the board. The surface uniformity of an image projected on the interactive board can be improved by applying the Fresnel lens sheet as a screen in the interactive board.

Figure 4:
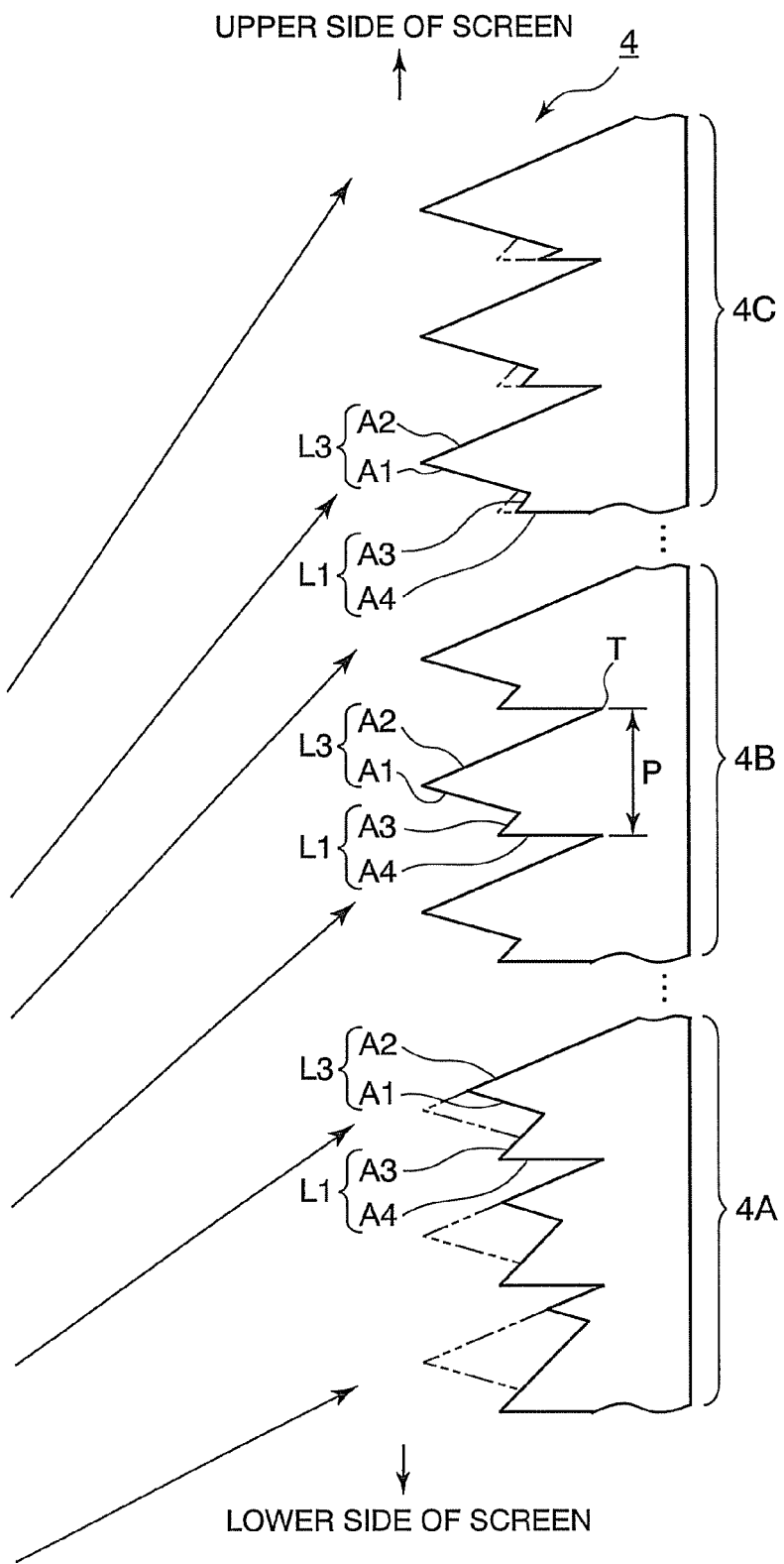
FIG. 4 is a diagram showing the sectional form of a Fresnel lens constituting a screen.

The Fresnel lens sheet has the function of collecting image light applied form the back surface side to form an image on a screen. A conventional Fresnel lens sheet may be used. The use of a hybrid or total reflection Fresnel lens rather than a refractive Fresnel lens can shorten the distance from the screen to the projector and thus can render the interactive board more compact. FIG. 4 is a diagram showing the sectional form of a Fresnel lens part 4 in a hybrid Fresnel lens. The Fresnel lens part 4 can be divided according to the sectional form into three regions of regions 4A, 4B, and 4C from the lower side of the screen (center side of Fresnel) towards the upper side of the screen (peripheral side of Fresnel). At the outset, the region 4A will be described as a basic form.

A unit prism part (a hybrid prism part) in the region 4A comprises a total reflection prism part L3 that has an incident surface (a second incident surface) A1 and a total reflection surface A2 and has an apex angle of 38 degrees, and a refractive prism part L1 that has an incident surface (a first incident surface) A3 and an ineffective surface A4. The unit prism part refers to a section from a valley line T, which is a line of intersection between the ineffective surface A4 and the total reflection surface A2 in adjacent unit prism parts, to an adjacent valley line T, and the pitch P in the unit prism part is 0.05 mm. The pitch P=0.05 mm is true of the unit prism parts in other regions 4B and 4C.

Figure 5:
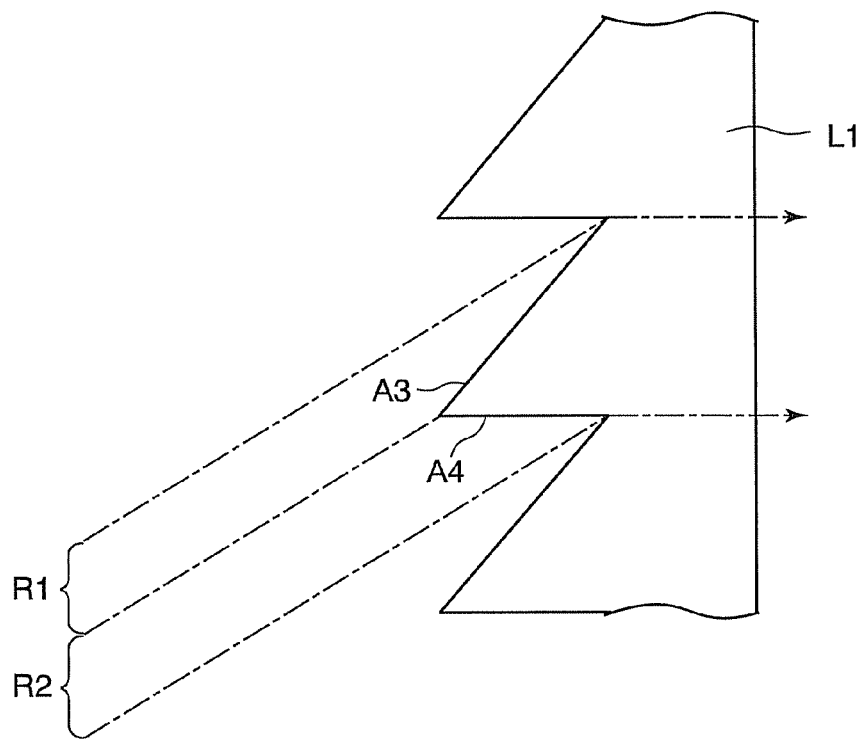
FIG. 5 is an enlarged view of the sectional form of a lens part in a part of a Fresnel lens.
Figure 6:
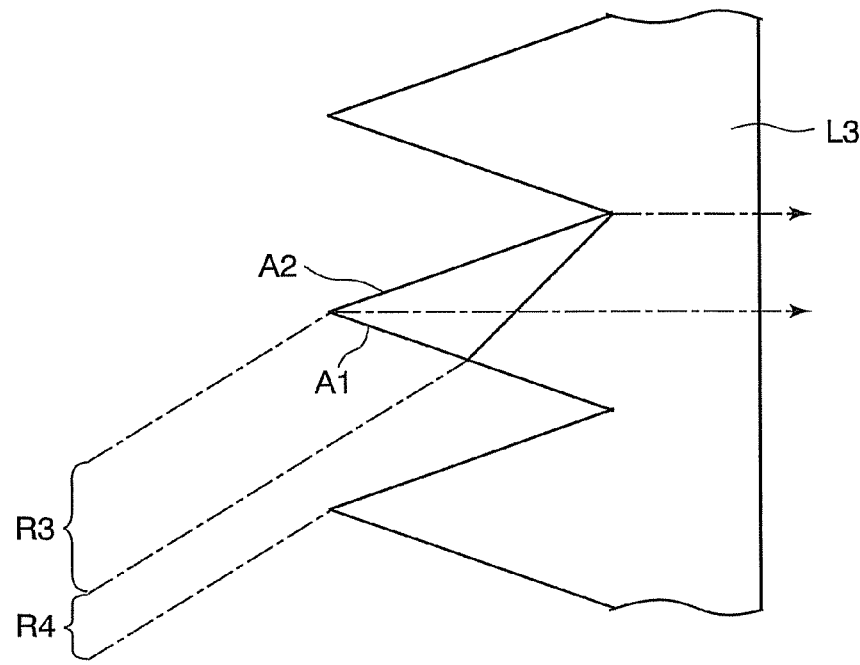
FIG. 6 is an enlarged view of the sectional form of a lens part in a part of a Fresnel lens.
Figure 7:
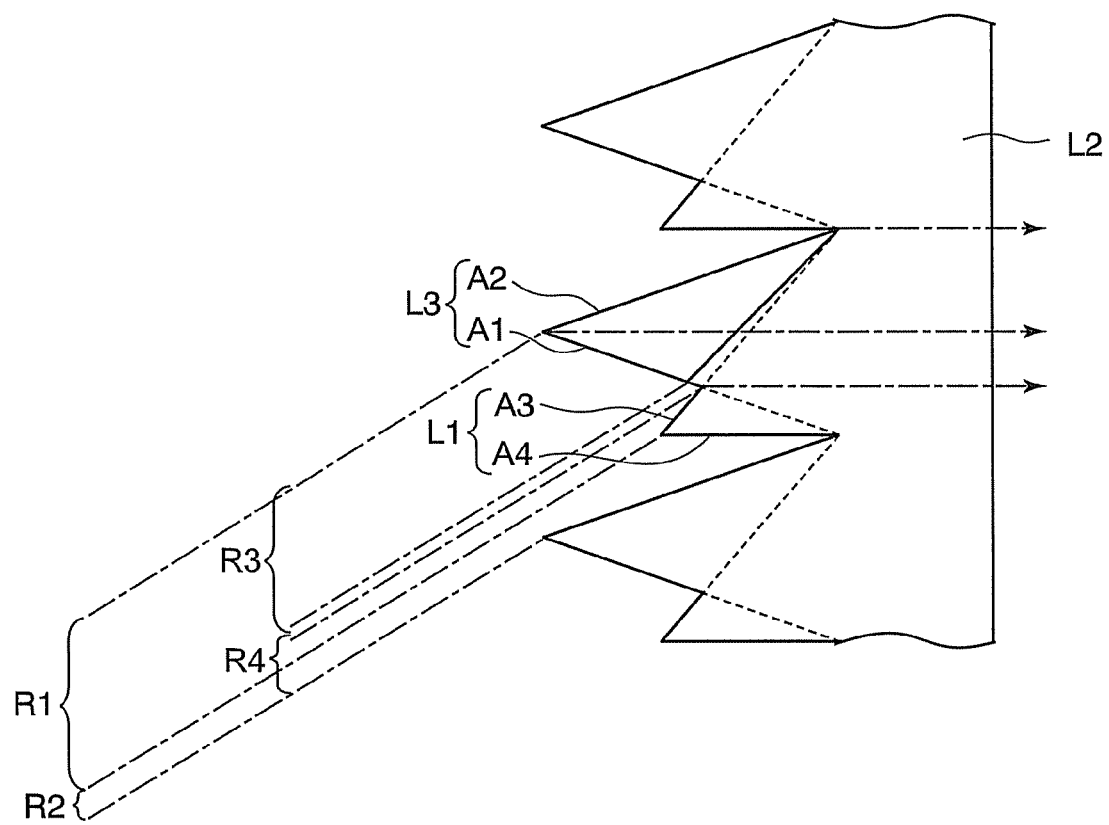
FIG. 7 is an enlarged view of the sectional form of a lens part in a part of a Fresnel lens.

FIGS. 5 to 7 are diagrams for explaining the total reflection prism part L3 and the refractive prism part L1. FIG. 5 shows a Fresnel lens consisting of unit prism part having the same shape as the refractive prism part L1 (a conventional Fresnel lens comprising a refractive prism part). A luminous flux R1 projected on the incident surface A3 is refracted by the incident surface A3 and is output in a desired direction. However, a luminous flux R2 projected on the ineffective surface A4 is reflected or refracted by the ineffective surface A4 to disadvantageously become stray light.

FIG. 6 shows a Fresnel lens consisting of unit prism parts having the same shape as the total reflection prism part L3 (a conventional Fresnel lens comprising a total reflection prism part). Among luminous fluxes projected on the incident surface A1, a luminous flux R3 is totally reflected by the total reflection surface A2 and is output in a desired direction. The remaining luminous flux R4, however, cannot arrive at the total reflection surface A2 and disadvantageously becomes stray light.

FIG. 7 shows a Fresnel lens part 4 in the above embodiment. In the Fresnel lens part 4, the unit prism part has a shape comprising a combination of the total reflection prism part L3 with the refractive prism part L1 from the viewpoint of realizing the output, in a desired direction, of a part of luminous fluxes, which cannot be output in a desired direction (in this embodiment, in a direction substantially perpendicular to the Fresnel lens part) by the Fresnel lens, shown in FIG. 5, consisting of the total reflection prism part L3 alone and cannot be output in a desired direction by the Fresnel lens, shown in FIG. 6, consisting of the refractive prism part L1 alone.

Specifically, in a total reflection prism part L3, a refractive prism part L1 is disposed at a part on which a luminous flux R4 that does not arrive at a total reflection surface A2 is projected. Accordingly, the Fresnel lens part is configured so that a part of the luminous flux R4 is refracted, is deflected in a desired direction, and is then output. This configuration can also be regarded as one in which, in the refractive prism part L1, the total reflection prism part L3 of an adjacent pitch on the Fresnel center side is disposed on an optical path of the luminous flux R2 projected on an ineffective surface A4. Accordingly, the Fresnel lens part is configured so that a part of the luminous flux R2 is totally reflected, is deflected in a desired direction, and is then output. That is, the total reflection prism part L3 and the refractive prism part L1 are disposed at respective positions where the total reflection prism part L3 and the refractive prism part L1 can compensate for mutual drawbacks.

The total reflection prism part L3 and the refractive prism part L1 are disposed so that, in one pitch in the region 4B in FIG. 4, a face formed by extending the incident surface A3 is passed through a valley line T on the peripheral side while a face formed by extending the incident surface A1 is passed through a valley line T on the Fresnel center side.

When the lens sheet including this Fresnel lens part is a large lens sheet having a size of about 50 inches, and when image light is projected from an oblique direction, the difference in incident angle of image light is increased dependent upon the incident position in the Fresnel lens part. In the total reflection prism part L3, when the incident angle is larger, the amount of the luminous flux output in a desired direction is larger. On the other hand, in the refractive prism part L1, when the incident angle is smaller, the amount of the luminous flux output in a desired direction is larger. Accordingly, the total reflection prism part L3 is suitable for the incident position where the incident angle is large, and the refractive prism part L1 is suitable for the incident position where the incident angle is small.

As shown in FIG. 4, in the region 4A on the lower side (a side closer to an image light source) of the screen in the Fresnel lens part, the refractive prism part L1 and the total reflection prism part L3 are used as a main unit prism part and a sub-unit prism part, respectively, and the proportion of the total reflection prism part L3 is smaller than the proportion of the refractive prism part L1. On the other hand, in the region 4C on the supper side (a side far from the image light source) of the screen, the total reflection prism part L3 and the refractive prism part L1 are used as a main unit prism part and a sub-unit prism part, respectively, and the proportion of the refractive prism part L1 is smaller than the proportion of the total reflection prism part L3.

The proportion of the total reflection prism part L3 and the proportion of the refractive prism part L1 can be varied by varying the depth of cut by a tool for use in cutting of a lens molding die through varying of the position as described in International Publication WO 2002/027399 to vary the height of the total reflection prism part L3 and the refractive prism part L1. The patent document is incorporated herein by reference.

In the above description, an embodiment where the Fresnel lens part 4 has three types of regions 4A, 4B, and 4C has been taken as an example. The present invention, however, is not limited to this embodiment, and the combination of these regions may be properly varied. For example, only the region 4A and the region 4B may be used to constitute the Fresnel lens part 4, or alternatively, an identical region type selected from the regions 4A, 4B, and 4C may be used to constitute each of the three regions.

An embodiment where the total reflection prism part and the refractive prism part used as the main unit prism part and the sub-unit prism part, respectively, has been described as an example. The present invention, however, is not limited to this embodiment and can also be applied to an embodiment where the refractive prism part and the total reflection prism part are used as the main unit prism part and the sub-unit prism part, respectively.

Figure 8:
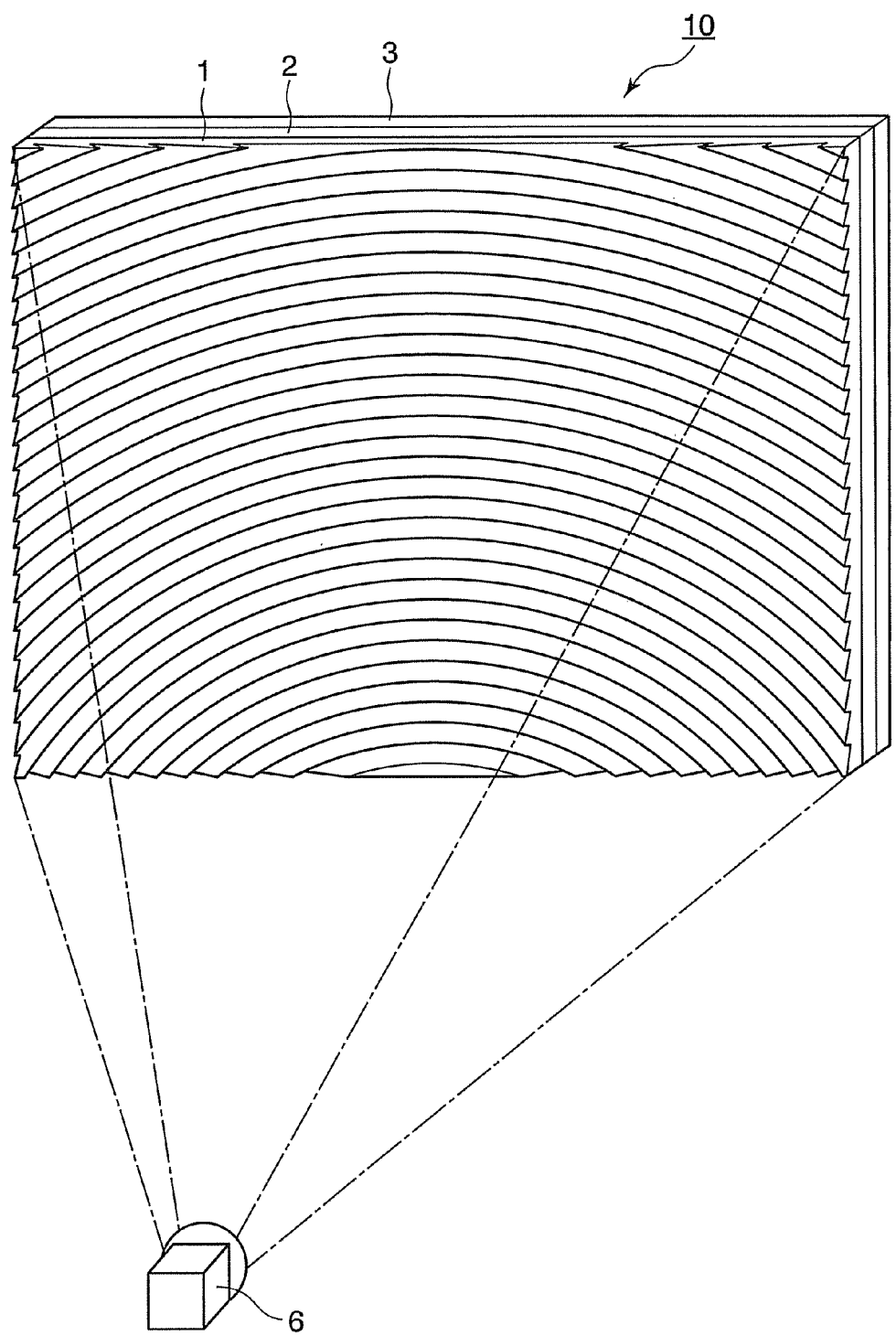
FIG. 8 is a schematic view of a transmission screen for an interactive board using a circular Fresnel lens.
Figure 9:
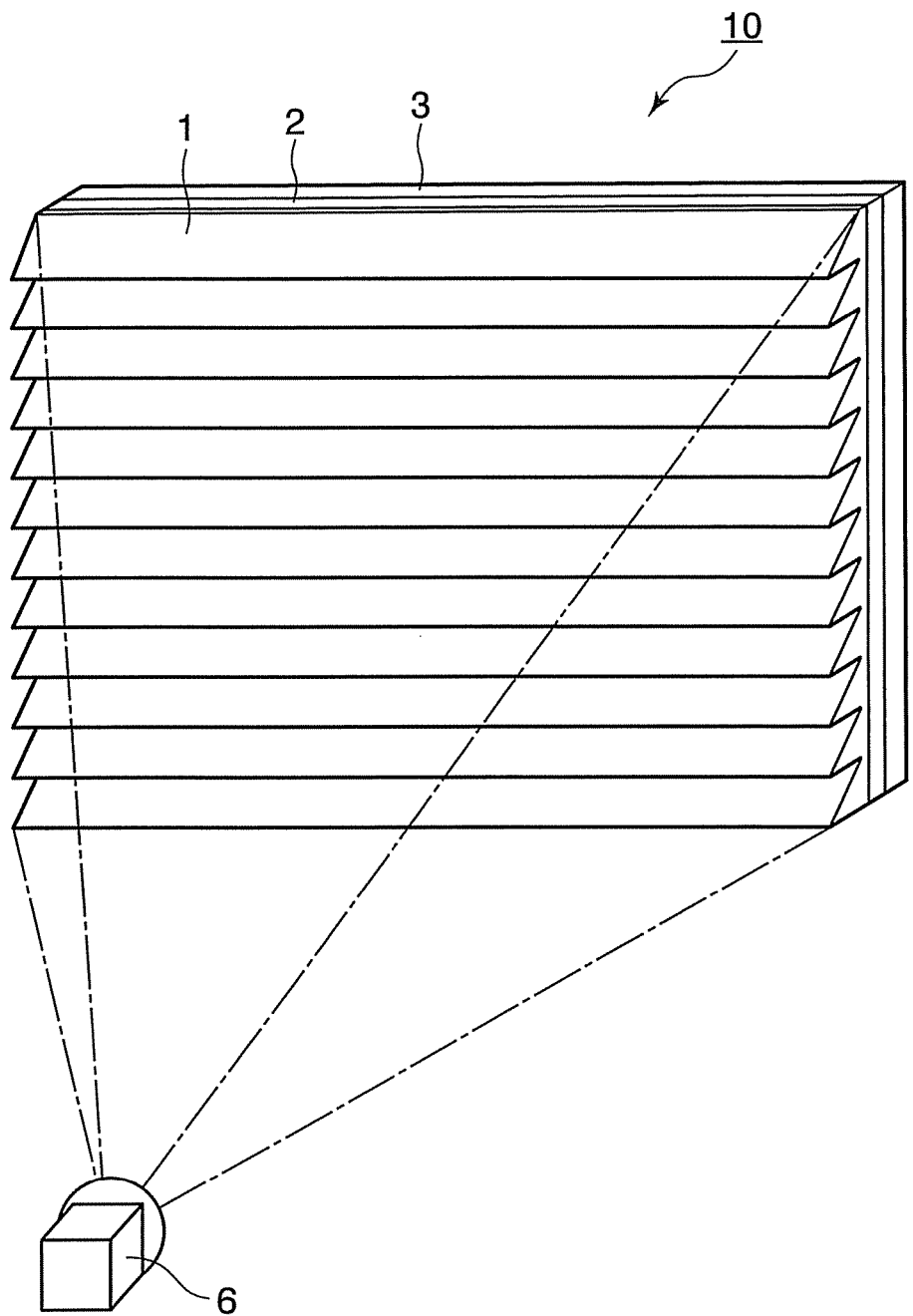
FIG. 9 is a schematic view of a transmission screen for an interactive board using a linear Fresnel lens.

A Fresnel lens comprising unit prism parts disposed next to each other has been described above. As shown in FIG. 8, the Fresnel lens part may be a circular Fresnel lens comprising unit prism parts that are arranged in a concentric fashion, or alternatively, as shown in FIG. 9, may be a linear Fresnel lens comprising lens parts that are continuously provided in a horizontal direction (or in a vertical direction).

The Fresnel lens sheet may be prepared by a conventional method and may be incorporated in the manufacture of a transmission screen, or alternatively may be molded onto a base material 25 for a light diffusing member described later to directly form a Fresnel lens.

<Light Diffusing Member>

In the present invention, as shown in FIG. 1, the light diffusing member is provided between the Fresnel lens sheet 1 and the hard coat layer 3 and functions to diffuse image light passed through the Fresnel lens sheet and thus to improve the visibility of the screen (board).

Figure 10:
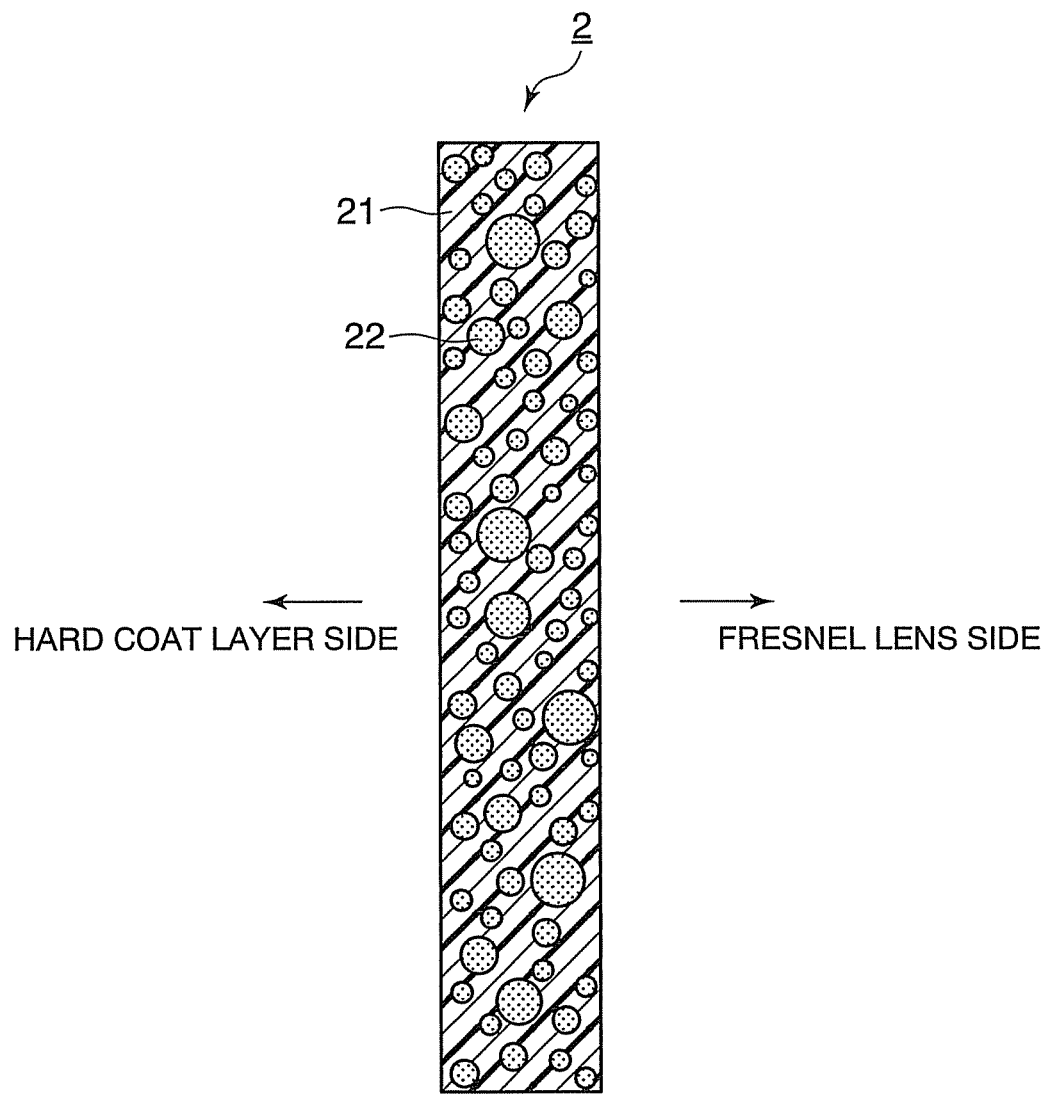
FIG. 10 is a diagram showing the sectional form of a light diffusing member constituting a screen.
Figure 11:
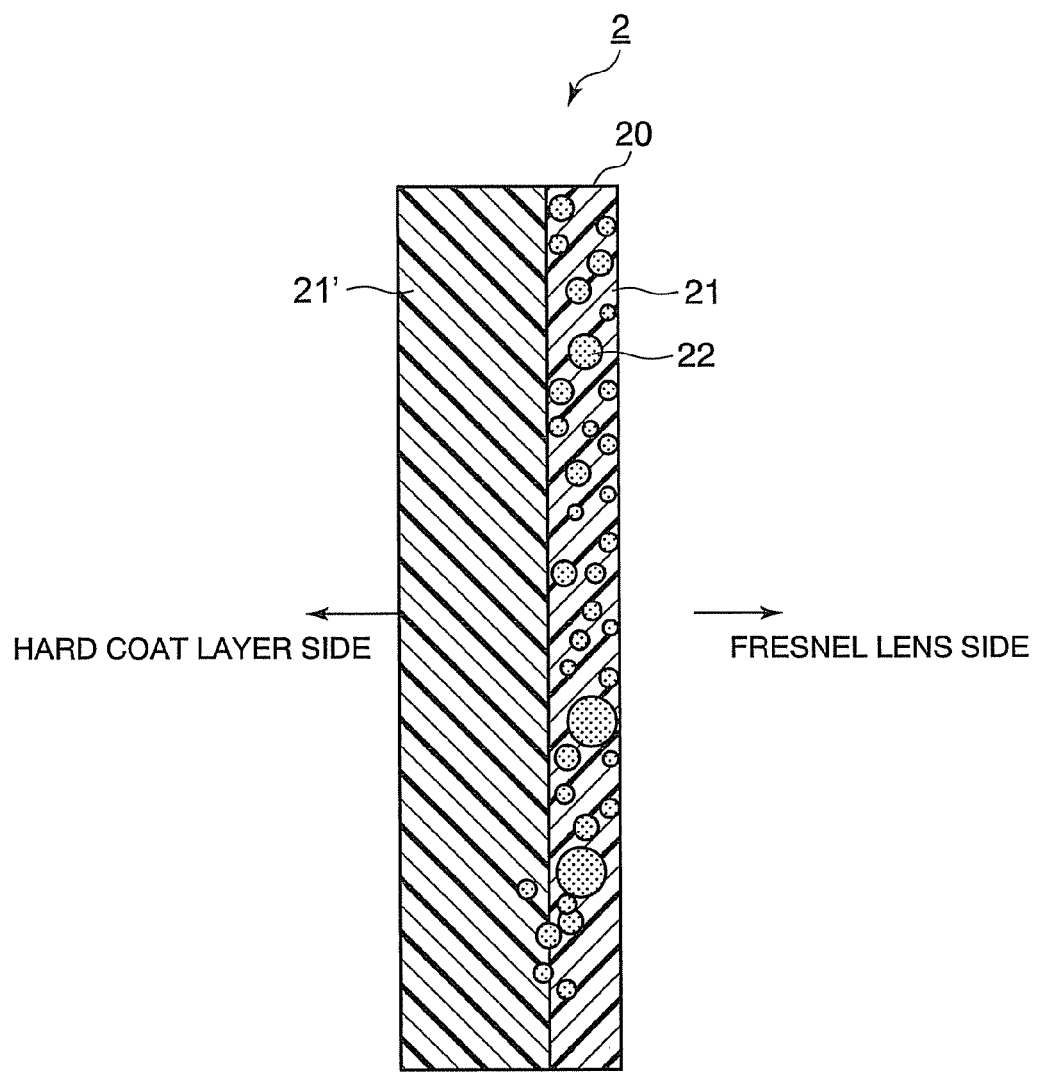
FIG. 11 is a diagram showing the sectional form of a light diffusing member in another embodiment constituting a screen.

A conventional light diffusing member used in the field of the screen may be used as the light diffusing member. For example, when writing on the board in the interactive board is taken into consideration, the light diffusing member should be rigid, to some extent. Regarding the layer construction of the light diffusing member, for example, as shown in FIG. 10, a base material 21 which is formed of a resin described later and contains fine particles 22 added thereto, or, as shown in FIG. 11, a laminate of a diffusing layer 20 formed of a base material 21 containing fine particles 22 and a base material 21' free from fine particles is suitable for the construction of the light diffusing member. Further, as described above, in order to enhance the rigidity of the light diffusing member, the light diffusing member may have a construction of a sheet comprising a diffusing layer and a film base material laminated to each other, the sheet being laminated to a glass base material or the like. The light diffusing member having the above layer construction can be obtained by stacking a diffusing layer formed by extrusion onto a base material through an adhesive layer described later.

The thickness of the base material used in the light diffusing member may be properly selected, as described above, while taking into consideration the rigidity of the member. Although the thickness of the base material may vary depending upon the size of the screen of the interactive board, when the size of the screen is about 80 inches, in the light diffusing member having a layer construction shown in FIG. 10, the thickness of the base material 21 is preferably 8 to 10 mm. On the other hand, when the light diffusing member has a layer construction shown in FIG. 11, preferably, the thickness of the diffusing layer 20 is about 1 mm while the thickness of the base material 21' is 7 to 9 mm. As shown in FIG. 11, when the light diffusing member having a two-layer structure is used, preferably, the thickness of the base material 21' free from fine particles is larger than the thickness of the base material 21 in the diffusing layer 20 from the viewpoint of providing sharper images. When the light diffusing member has a construction comprising a sheet laminated to a glass base material, the sheet being formed of a laminate of a diffusing layer and a film base material, the thickness of the glass base material and the thickness of the sheet formed of the laminate of the diffusing layer and the film base material may be 4 to 6 mm and several hundreds of micrometers, respectively.

Light transparent resins, for example, acrylic resins, polyurethane resins, polyester resins, polyvinyl chloride resins, polyvinyl acetate resins, cellulosic resins, polyamide resins, fluororesins, polypropylene resins, polystyrene resins, styrene-acrylic resins, and transparent glass are suitable as the base material 21 (21'). When the light diffusing member having a layer construction as shown in FIG. 10 is contemplated, a fine particle-containing base material can be obtained by adding a predetermined amount of fine particles described later in the extrusion of the resin by a melt extruder. Further, when the light diffusing member having a two-layer construction as shown in FIG. 11 is contemplated, a transparent resin film, a transparent resin plate, a transparent resin sheet, or a transparent glass may be used as the base material sheet. Suitable transparent resin films include triacetate cellulose (TAC) films, polyethylene terephthalate (PET) films, diacetylcellulose films, cellulose acetate butyrate films, polyethersulfone films, polyacrylic resin films, polyurethane resin films, polyester films, polycarbonate films, polysulfone films, polyether films, polymethylpentene films, polyether ketone films, and (meth)acrylonitrile films.

Organic fillers such as plastic beads are suitable as the fine particles 22, and the use of organic fillers having a high level of transparency is particularly preferred. Such plastic beads include melamine beads (refractive index 1.57), acrylic beads (refractive index 1.49), acryl-styrene beads (refractive index 1.54), polycarbonate beads, polyethylene beads, polystyrene beads, polyvinyl chloride beads, and silicone beads (refractive index 1.41). When the layer construction as shown in FIG. 10 is contemplated, fine particles should be properly selected while taking into consideration the difference in refractive index between the base material and the fine particles. For example, when the base material is formed of a methyl (meth)acrylate-styrene resin (refractive index 1.55) or a methyl (meth)acrylate-butadiene-styrene resin (refractive index 1.55), acryl beads or silicone beads are suitable as the fine particles. The particle diameter of the plastic beads is not particularly limited, but is generally approximately 1 to 15 µm. On the other hand, when silicone beads are used, the particle diameter is approximately 0.5 to 5 µm.

When the fine particles 22 are mixed as the organic filler in the base material 21, the organic filler is likely to settle in the resin for constituting the base material. An inorganic filler such as silica may be added for settling preventive purposes. The larger the amount of the inorganic filler added, the better the effect of the prevention of settling of the organic filler. In this case, however, the transparency of the coating film is adversely affected. For this reason, the addition of the inorganic filler having a particle diameter of not more than 5 µm in an amount of less than about 0.1% by weight based on the organic filler (fine particles 22) is preferred from the viewpoint of preventing the settling of the organic filler without sacrificing the transparency of the coating film.

Figure 12:
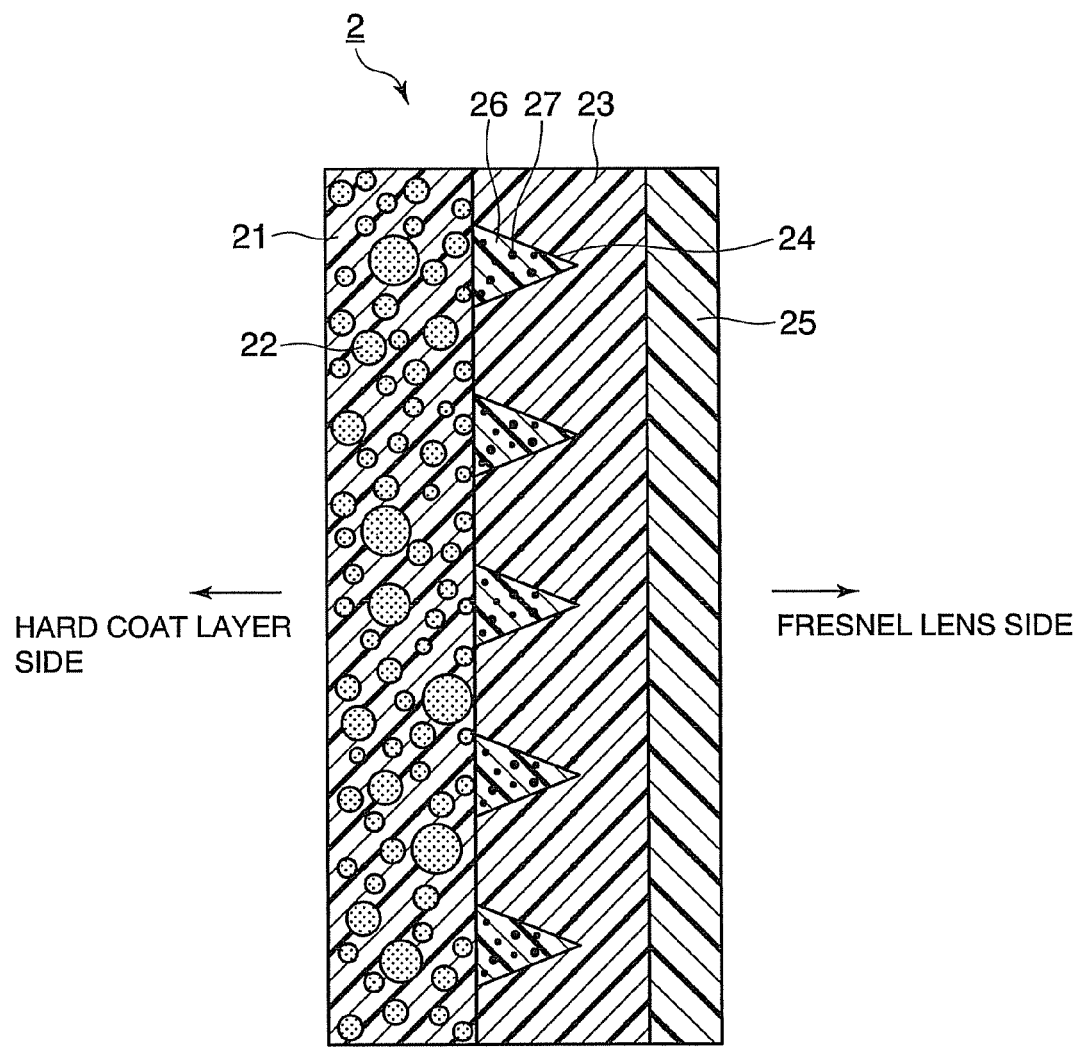
FIG. 12 is a diagram showing the sectional form of a light diffusing member in a further embodiment constituting a screen.
Figure 13:
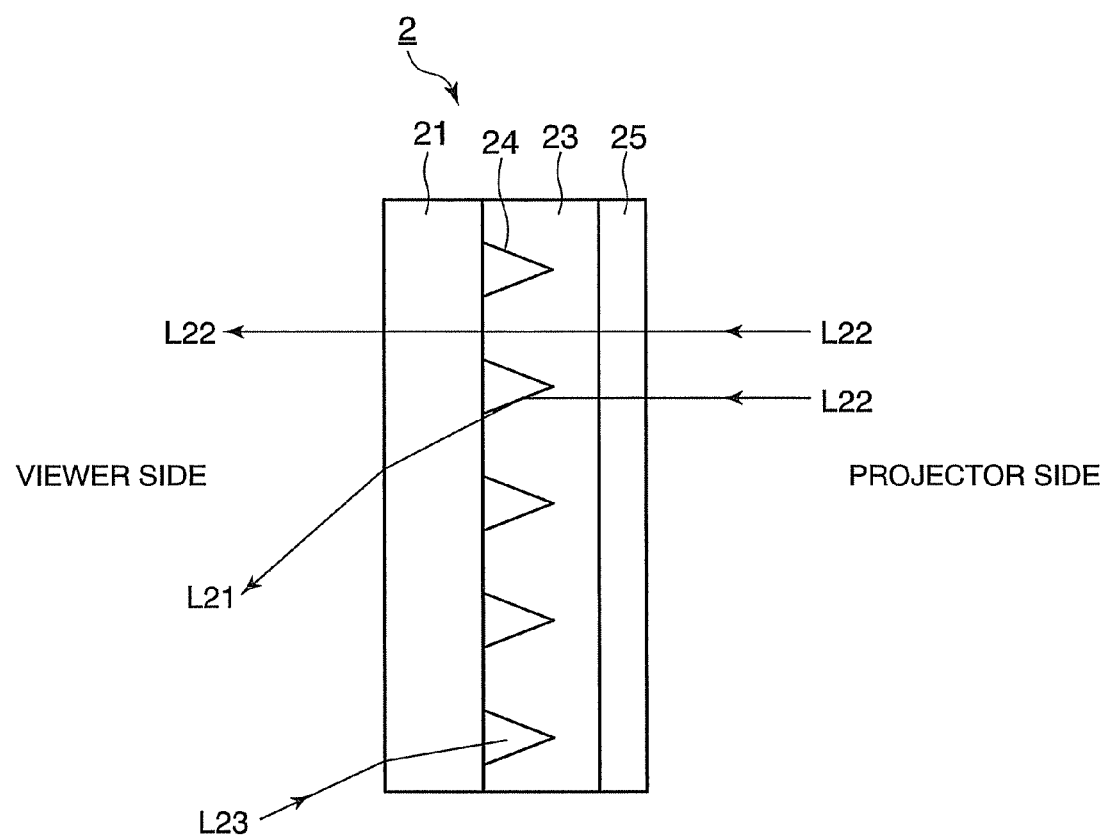
FIG. 13 is a typical diagram for explaining an optical function of a combination of the light diffusing member shown in FIG. 12 with a horizontal direction view angle widening member.

The light diffusing member may have structures as shown in FIGS. 10 and 11. Further, the light diffusing member may have a structure as shown in FIG. 12. Specifically, the light diffusing member may comprise a combination of a member, comprising fine particles 22 added into a base material 21, with a horizontal direction view angle widening member having a structure comprising a light transparent part 23 and a light absorbing part 24 provided on a lens base material 25. The light transparent part 23 in the horizontal direction view angle widening member is formed on the lens base material 25 formed of, for example, polyethylene terephthalate, for example, by a conventional UV molding method. The light absorbing part 24 is molded in a wedge form between substantially trapezoidal parts in the light transparent part 23. The light absorbing part 24 has been formed by mixing particles 27, of which the surface has been treated to be rendered light-absorptive, into a light transparent resin 26 and curing the mixture in a wedge form. Alternatively, the light absorbing part 24 may also have been formed by additionally mixing a dye, a pigment or the like having a light absorbing capability, into particles 27, which have been treated to be rendered light-absorptive, and curing the mixture, or by mixing a dye, a pigment or the like having a light absorbing capability into a light transparent resin 26 without the use of the particles 27, which have been treated to be rendered light-absorptive, and curing the mixture. For example, conventional ionizing radiation curable resins can be properly used as the light transparent resin. Regarding the horizontal direction view angle widening member, the image light diffusing action can be increased by adopting a form that allows the interface between the light transparent part 23 and the light absorbing part 24 to have a reflecting function. FIG. 13 is a diagram showing an optical function obtained by a combination of the light diffusing member, shown in FIG. 12, with the horizontal direction view angle widening member. An image light L22 which does not hit against the interface between the light transparent part 23 and the light absorbing part 24 goes straight, and an image light L21 which hits against the interface between the light transparent part 23 and the light absorbing part 24 is reflected, whereby the light diffusing function can be exerted. A part L23 of external light can be absorbed in the light absorbing part 24 to prevent the contrast being lowered by the external light.

In order to widen the view angle and reflect the image light from an oblique direction, the refractive index of the light transparent part 23 in the horizontal direction view angle widening member may be rendered higher than that of the light absorbing part 24. Further, a combination of a member, which is formed of a laminate of a diffusing layer 20 comprising a base material 21 containing fine particles 22 and a fine particle-free base material 21', with the horizontal direction view angle widening member may be adopted. The incorporation of the horizontal direction view angle widening member in the light diffusing member shown in FIGS. 10 and 11 is advantageous in that high visibility can be obtained by virtue of freedom from the reflection of external light onto the screen, and a good contrast and a sharp image can be realized. Further, the addition of a coloring matter to the light diffusing member can contribute to an improvement in contrast of the image although the transmittance of the screen is lowered.

<Hard Coat Layer>

In this embodiment, the hard coat layer is provided on an outgoing light side of the screen (a front side of the screen) and functions to improve the scratch resistance of the surface of the screen and to smoothen the screen per se. When a light transmission screen according to the present invention is applied to the interactive board, possessing the scratch resistance is required of the screen per se, because the screen on its front side as the outgoing light side functions also as a screen side on which images such as letters or figures are written with a writing instrument or the like. Further, the screen per se should be smooth so that letters and the like can easily be written with a writing instrument. In the present invention, the provision of the hard coat layer can solve the above two problems.

The hard coat layer may be one known in the field of screens. For example, resins curable by ultraviolet or electron beam irradiation, that is, ionizing radiation curable resins, a mixture of an ionizing radiation curable resin with a thermoplastic resin and a solvent, and heat curable resins may be used for hard coat layer formation. Among them, ionizing radiation curable resins are particularly preferred.

The film forming component in the ionizing radiation curable resin composition is preferably one containing an acrylate functional group, for example, one containing a relatively large amount of a relatively low-molecular weight polyester resin, a polyether resin, an acrylic resin, an epoxy resin, a urethane resin, an alkyd resin, a spiroacetal resin, a polybutadiene resin, or a polythiol-polyene resin, an oligomer or a prepolymer of (meth)acrylate or the like of a polyfunctional compound, such as polyhydric alcohol, and a reactive diluent, for example, a monofunctional monomer, such as ethyl (meth)acrylate, ethylhexyl (meth)acrylate, styrene, methyl styrene, and N-vinylpyrrolidone, and a polyfunctional monomer, for example, polymethylolpropane tri(meth)acrylate, hexanediol (meth)acrylate, tripropylene glycol di(meth)acrylate, diethylene glycol di(meth)acrylate, pentaerythritol tri (meth)acrylate, dipentaerythritol hexa(meth)acrylate, 1,6-hexanediol di(meth)acrylate, or neopentyl glycol di(meth) acrylate.

When the use of the ionizing radiation curable resin composition as an ultraviolet curable resin composition is contemplated, photopolymerization initiators such as acetophenones, benzophenones, Michler's benzoyl benzoate, α-amyloxime esters, tetramethylthiuram monosulfide, or thioxanthones, or photosensitizers such as n-butylamine, triethylamine, or poly-n-butylphosphine may be mixed into the composition. In particular, in the present invention, mixing urethane acrylate as an oligomer and dipentaerythritol hexa (meth)acrylate and the like as a monomer are preferred.

The ionizing radiation curable resin composition can be cured by a conventional curing method, that is, by applying electron beams or ultraviolet light.

For example, in the case of curing by electron beam irradiation, use may be made of electron beams having an energy of 50 to 1000 Key, preferably 100 to 300 KeV, emitted from various electron beam accelerators, such as Cockcroft-Walton accelerator, van de Graaff accelerator, resonance transformer, insulated core transformer, linear, dynamitron, and high-frequency electron accelerators. On the other hand, in the case of curing by ultraviolet irradiation, ultraviolet light emitted from light sources, such as ultrahigh pressure mercury lamps, high pressure mercury lamps, low pressure mercury lamps, carbon arc, xenon arc, and metal halide lamps, may be utilized.

The hard coat layer can be formed by coating a coating solution of the ionizing radiation (ultraviolet light) curable resin composition onto a base material by a method such as spin coating, die coating, dip coating, bar coating, flow coating, roll coating, or gravure coating and curing the coating by the above means. Alternatively, the hard coat layer may be formed by coating the coating solution directly on the light diffusing member and curing the coating.

The hard coat layer may have an anti-dazzling function. In order to impart the anti-dazzling function, fine concaves and convexes which irregularly reflect external light are formed on the surface of the base material by adding an inorganic filler such as silica into the hard coat layer or by dispersing beads of a polystyrene resin, an acrylic resin or the like having a diameter of approximately several micrometers in the hard coat layer. In addition to a method in which a filler or the like is added directly to the base material, a method may also be adopted in which a coating film formed of a transparent resin binder containing an inorganic filler or the like added thereto may be provided on a base material. In this case, for example, ionizing radiation curable resins are suitable as the transparent resin binder. In forming the hard coat layer, the surface of the hard coat layer may be shaped so as to have fine concaves and convexes. For example, a hard coat layer having a surface with fine concaves and convexes provided thereon can be formed by coating a coating solution of the ionizing radiation (ultraviolet light) curable resin composition onto a base material and curing the resin while shaping the surface of the coating film by a roll-shaped mold having fine concaves and convexes on its surface to form fine concaves and convexes.

<Adhesive Layer>

As described above, a laminate structure comprising a Fresnel lens sheet 1, a light diffusing member 2, and a hard coat layer 3 which are in direct contact with each other may be adopted. As shown in FIGS. 2 and 3, however, the layers may be stacked on top of each other through an adhesive layer. The adhesive layer may be formed of a conventional pressure-sensitive adhesive or UV curable pressure-sensitive adhesive, and examples of such adhesives include acrylic ester pressure-sensitive adhesives, urethane acrylate pressure-sensitive adhesives, and epoxy acrylate pressure-sensitive adhesives. The use of a pressure-sensitive adhesive having a refractive index similar to the refractive index of each layer or member among the pressure-sensitive adhesives can suppress reflection at the interface. In the combination with the pressure-sensitive adhesive, preferably, both the pressure-sensitive adhesive and the layer (member) to be bonded are properly selected so that the difference in refractive index between the layer (member) to be bonded and the adhesive layer is not more than 0.1.

The layers (or member) may be stacked on top of each other through an adhesive layer by coating the pressure-sensitive adhesive onto the layers (or member) by a conventional coating method such as transfer printing, a knife coater method, a roll coater method, a Komma coater method, or a gravure coater method and heat-drying the coating by infrared light, hot air, steam or the like, or by coating the pressure-sensitive adhesive onto the layers (or member) and applying ultraviolet light to cure the pressure-sensitive adhesive.

<Other Layers and Means>

In the present invention, an antireflection layer or positional information detection means may be further provided on the outgoing light side of the hard coat layer.

The antireflection layer generally comprises a higher-refractive index layer and a lower-refractive index layer stacked in that order or may have other laminate structure. The higher-refractive index layer is, for example, a thin film of a ZnO or $TiO_2$ material, or a transparent resin film with fine particles of these materials dispersed therein. The lower-refractive, index layer is a thin film of $SiO_2$, an $SiO_2$ gel film, or a transparent resin film containing fluorine or containing fluorine and silicon. Stacking of the antireflection layer can lower the reflection of unnecessary light such as external light on the stacked side and thus can enhance the contrast of images or video images light.

Alternatively, the antireflection layer may also be formed by alternately stacking a lower-refractive index component and a higher-refractive index component onto the hard coat layer by a dry method such as vapor deposition or sputtering or a wet method such as coating. Further, a laminate formed by forming an antireflection film on a sheet or a film may be provided on the hard coat layer.

Positional information detection means may be provided on the screen. For example, a conventional touch sensor may be provided between the hard coat layer and the light diffusing member. The provision of the positional information detection means can realize interactive exchange between image information projected from a personal computer and letters or figure information written on a screen (a board) when the transmission screen is applied to an interactive board. The touch sensor may adopt a conversional system such as a resistance film system, a capacitance system, an ultrasonic system, an electromagnetic induction system, an infrared system, or an image recognition system. For example, when the infrared system is adopted, the installation of an infrared light source for projecting infrared light onto the back surface of the screen and an infrared detector capable of detecting the infrared light on the back surface side (that is, a projection light source side) of the screen (board) can realize the detection of positional information such as letters or figures written on the board and the transmission of the positional information to an image information device. As a result, interactive exchange between the image information from an image information device such as a personal computer and information such as letters written on the interactive board can be realized.

<Transmission Screen for Interactive Board in Second Embodiment>

Figure 14:
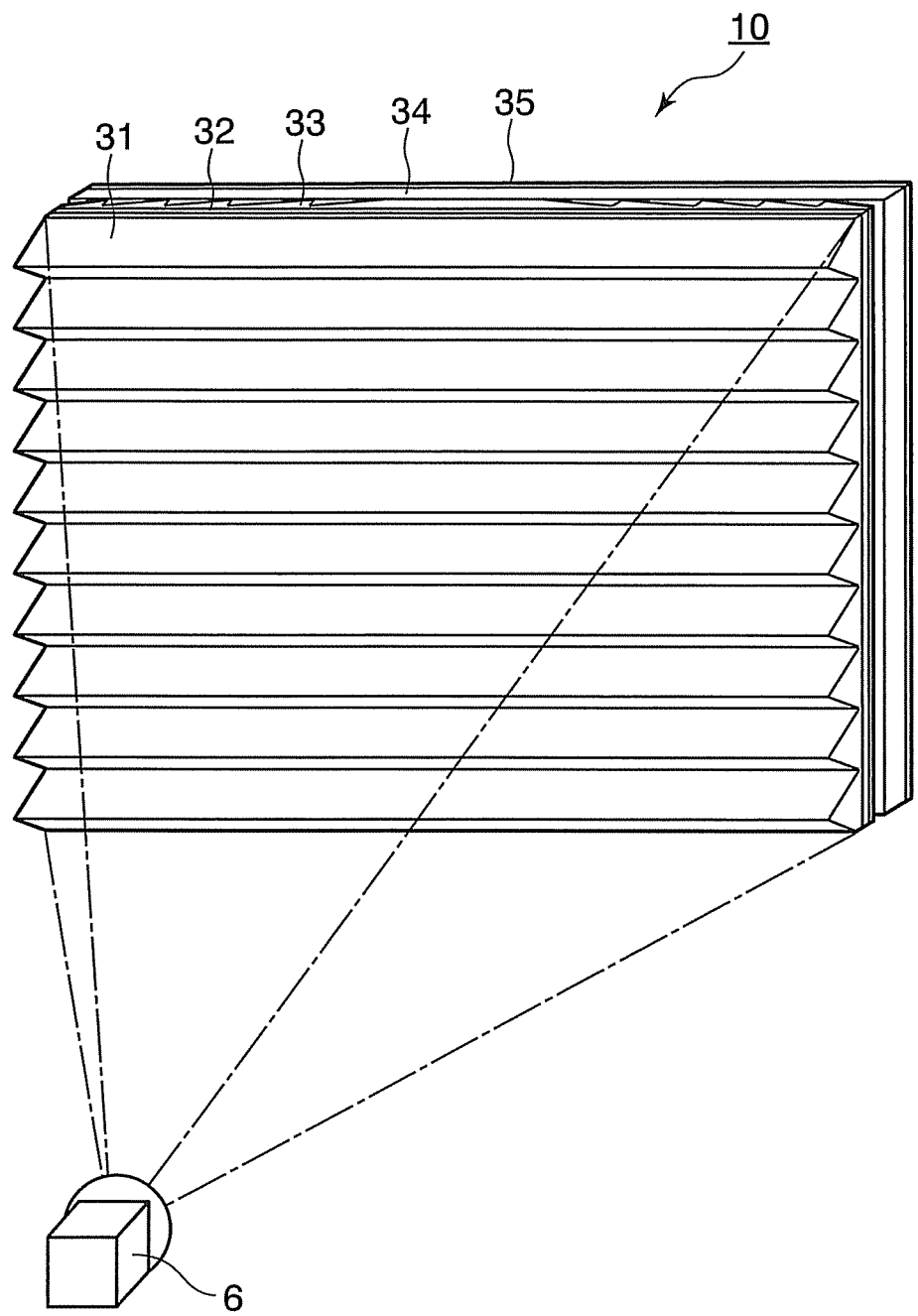
FIG. 14 is a perspective view of a transmission screen for an interactive board in a second embodiment of the present invention.

FIG. 14 is a perspective view of a transmission screen for an interactive board in the second embodiment of the present invention.

As shown in FIG. 14, a transmission screen 10 for an interactive board in this embodiment is a transmission screen, for an interactive board, comprising lens parts 31, 33 provided respectively on both surfaces of a transparent base material 32. The transmission screen 10 comprises at least: a total reflection linear Fresnel lens part 31 comprising prisms that have a total reflection function and are arranged in a vertical direction on an incident light side, that is, one surface of the transparent base material 32; a linear prism lens part 33 comprising prisms that are arranged, on the transparent base material 32 on its surface side remote from the total reflection linear Fresnel lens part 31, in a direction orthogonal to the direction of the disposition of the total reflection linear Fresnel lens part 31; a light diffusing member 34 provided on the outgoing light side of the linear prism lens part 33; and a hard coat layer 35 provided on the outgoing light side of the light diffusing member 34.

As with the transmission screen for an interactive board in the first embodiment, the transmission screen 10 for an interactive board applies video image light through the back surface side of the transmission screen 10 for an interactive board from a projector and outputs video image light from the front surface of the transmission screen 10 for an interactive board. Thus, when the transmission screen for an interactive board is applied, video image light can be introduced through the back surface side of the transmission screen 10 for an interactive board and, hence, blocking of the display image in writing on the interactive board can be avoided.

Individual members constituting the transmission screen for an interactive board in the second embodiment of the present invention will be described.

<Total Reflection Linear Fresnel Lens Part>

Figure 15:
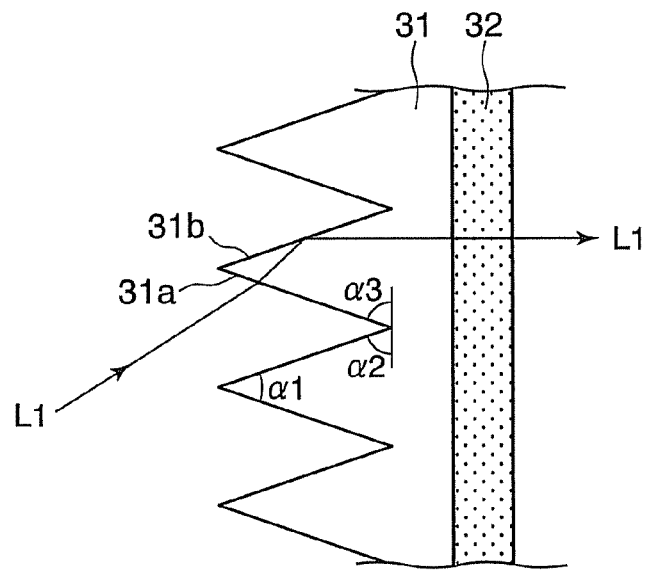
FIG. 15 is a typical diagram for explaining an optical function of a total reflection linear Fresnel lens part.

As shown in FIG. 15, the total reflection linear Fresnel lens part 31 comprising vertically arranged prisms, which is provided on an incident light side and has a total reflection function, functions to refract video image light L1, which is enlarged and projected from a projector, at a first surface 31a in a prism in a total reflection linear Fresnel lens part 31, and to totally reflect the video image light L1 at a second surface 31b in the total reflection linear Fresnel lens part 31, whereby the video image light L1 is deflected in a direction substantially perpendicular to the transmission screen for an interactive board.

In this embodiment, the total reflection linear Fresnel lens part 31 extends in a horizontal direction and is disposed in a vertical direction and, thus, functions to focus video image light, which is enlarged and projected, with respect to the vertical direction. Further, as shown in FIG. 15 (a layer on an outgoing side relative to the transparent base material 32 being omitted), the total reflection linear Fresnel lens part 31 has a first surface 31a and a second surface 31b, has an apex angle of $\alpha1$, and has an angle of oblique surface of $\alpha2$ for the first surface 31a and of $\alpha3$ for the second surface 31b. A transparent base material 32 is provided on the outgoing side (viewer side) of the total reflection linear Fresnel lens part 31. The three angles, $\alpha1$, $\alpha2$ and $\alpha3$, are properly set while taking into consideration optical conditions for enlargement and projection and moldability of the total reflection linear Fresnel lens. The lens part on the incident light side has been described by taking the total reflection linear Fresnel lens part 31 as an example. Alternatively, in the present invention, the above-described hybrid linear Fresnel lens part comprising both prisms having a total reflection function and prisms having a refraction function may be used instead of the total reflection linear Fresnel lens part.

<Linear Prism Lens Part>

Figure 16:
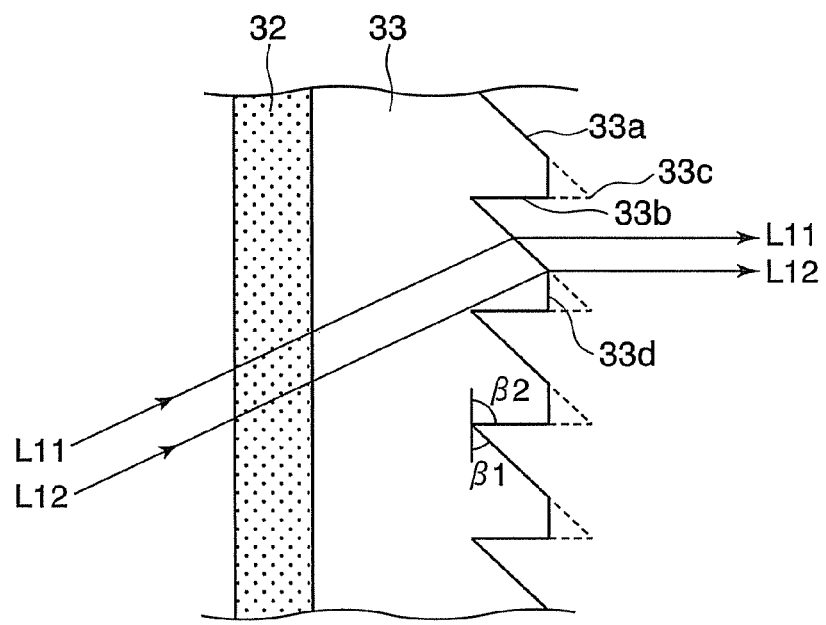
FIG. 16 is a typical diagram for explaining an optical function of a linear prism part.

The linear prism part 33 comprises prisms that are arranged, on the transparent base material 32 on its surface side remote from the total reflection linear Fresnel lens part 31, in a direction perpendicular to the direction of disposition of the total reflection linear Fresnel lens part 31. FIG. 16 is an enlarged cross-sectional view of the linear prism part 33. As shown in FIG. 16, the linear prism part 33 functions to refract video image lights L11, L12, enlarged and projected from a projector, at a first surface 33a of the prism in the linear prism part 33 and to deflect the video image lights in a substantially perpendicular direction of the transmission screen for an interactive board. The linear prism part 33 comprises prisms arranged in a direction perpendicular to the total reflection linear Fresnel lens part 31, extends in a vertical direction and is disposed in a horizontal direction. Accordingly, the enlarged and projected video image light can be focused mainly with respect to the horizontal direction. The combination of the total reflection linear Fresnel lens part with the linear prism part disposed in a direction perpendicular to the total reflection linear Fresnel lens part can realize the collection of video image light in a vertical direction and a horizontal direction and can provide a good image having a good brightness distribution of video image light to user present in front of the interactive board.

The optical function of the linear prism part will be described with reference to FIG. 16. The linear prism part 33 is disposed on the outgoing side of the transparent base material 32, and the prism has a first surface 33a and a second surface 33b that is a rising surface. The prism angle is $\beta1$, and the angle of oblique surface of the second surface, which is the rising surface, is $\beta2$. The two angles, $\beta1$ and $\beta2$, are properly set while taking into consideration the optical conditions for enlargement and projection and the moldability of the linear prism part.

In order to integrate the light diffusing member 34 (not shown) disposed on the outgoing side relative to the linear prism part 33, the total reflection linear Fresnel lens part 31 disposed on the incident light side, which is one surface of the transparent base material 32, and the linear prism lens part 33 disposed on the surface side remote from the transparent base material 32, the apex 33c of the prisms in the linear prism lens part 33 may be machined into a flat surface 33d. In this embodiment, in molding the total reflection linear Fresnel lens part 31 and the linear prism part 33, the transparent base material may be utilized to form desired shapes respectively on both the surfaces of the transparent base material. Alternatively, the transparent base material may if necessary be omitted. When the transparent base material is omitted, the base excluding parts (lens part and prism part) having optical shapes respectively on both surfaces can be regarded as corresponding to the transparent base material.

The transparent base material may be formed of a transparent resin film, a transparent resin plate, or a transparent resin sheet. Examples of suitable transparent resin films include triacetate cellulose (TAC) films, polyethylene terephthalate (PET) films, diacetylcellulose films, cellulose acetate butyrate films, polyethersulfone films, polyacrylic resin films, polyurethane resin films, polyester films, polycarbonate films, polysulfone films, polyether films, polymethylpentene films, polyether ketone films, and (meth)acrylonitrile films. The thickness of the base material may be properly selected and is generally approximately 25 to 500 μm.

<Light Diffusing Member>

The light diffusing member functions to diffuse video image light passed through the linear prism part 33 and to improve the visibility of the screen (board). The light diffusing member may be a conventional member known in the field of screens. In the transmission screen for an interactive board in this embodiment, the light diffusing member is preferably the same as that in the first embodiment of the present invention.

Figure 17:
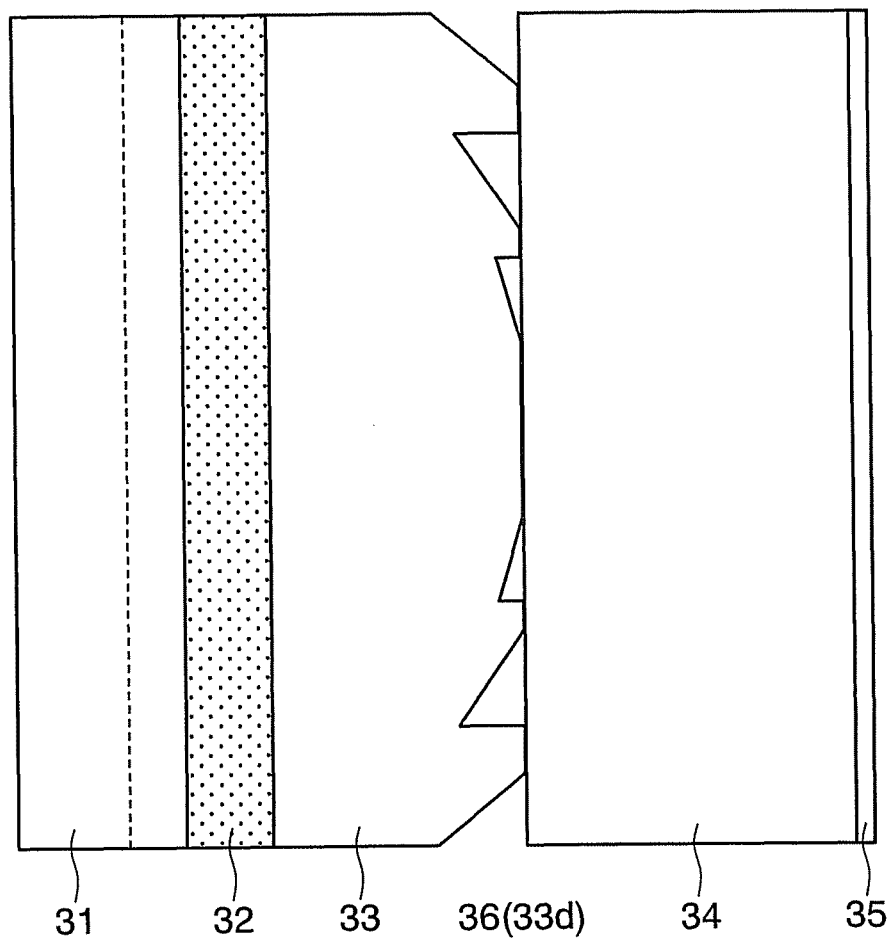
FIG. 17 is a cross-sectional view of one embodiment of a transmission screen for an interactive board according to the present invention.

As with the first embodiment of the present invention, the linear prism part 33 and the light diffusing member 34 may constitute a laminate structure in which the linear prism part 33 and the light diffusing member 34 are in contact with each other. Alternatively, the linear prism part 33 and the light diffusing member 34 may be laminated onto each other through an adhesive layer. The adhesive layer may be the same as that in the first embodiment of the present invention. When the linear prism part and the light diffusing member are laminated onto each other through the adhesive layer, as shown in FIG. 16, the apex 33c of the prisms in the linear prism part 33 is machined to provide a flat surface 33*d* in a region through which video image lights L11, L12 which are enlarged and projected are not passed. The flat surface 33*d* of the prisms in the linear prism part 33 can be used as a joining layer 36 to integrate the linear prism part 33 with the light diffusing member 34. As shown in FIG. 17, when the members constitute an integrated structure, a bright and good video image can be provided without causing loss of video image light. Further, the transmission screen for an interactive board has an integrated structure and, thus, can eliminate the problem of a lowering in video image quality, which occurs in a transmission screen for an interactive board, comprising two optical sheets stacked on top of each other, for example, due to the occurrence of a gap between the optical sheets or damage to the sheets.

<Hard Coat Layer>

In this embodiment, as shown in FIG. 17, the hard coat layer 35 is provided on the outgoing light side of the screen (front side of the screen) and functions to improve the scratch resistance of the surface of the screen and, at the same time, to smoothen the screen per se. When the transmission screen according to the present invention is applied to the interactive board, the screen on its front side which is a outgoing light side is also a screen on which images such as letters or figures are written with a writing instrument or the like. Thus, possessing the scratch resistance is required of the screen per se. Further, from the viewpoint of easy writing of letters or the like with a writing instrument, the screen per se should be smooth. In the present invention, the provision of the hard coat layer can solve the above two problems. Preferably, in the transmission screen for an interactive board in this embodiment, the hard coat layer is the same as that in the first embodiment.

<Other Layers and Means>

In this embodiment, an antireflection layer and a positional information detection means can be additionally provided on the outgoing light side of the hard coat layer. The antireflection layer and the positional information detection means may be the same as those in the transmission screen for an interactive board in the first embodiment of the present invention.

<Method for Manufacturing Transmission Screen for Interactive Board>

The method for manufacturing a transmission screen for an interactive board according to the present invention comprises the steps of:

a) providing a mold for molding the total reflection linear Fresnel lens part comprising prisms that have a total reflection function and are arranged next to each other in a vertical direction; b) providing a mold for molding the linear prism lens part; and c) continuously supplying a transparent base material into the two molds, supplying a photocurable resin into between the transparent base material and the two molds, irradiating the photocurable resin with light to cure the photocurable resin, and separating a molded product from the two molds. A mold for molding a total reflection linear Fresnel lens part comprising prisms having a total reflection function arranged in a vertical direction and a mold for forming a linear prism lens part will be first described.

Figure 18A:
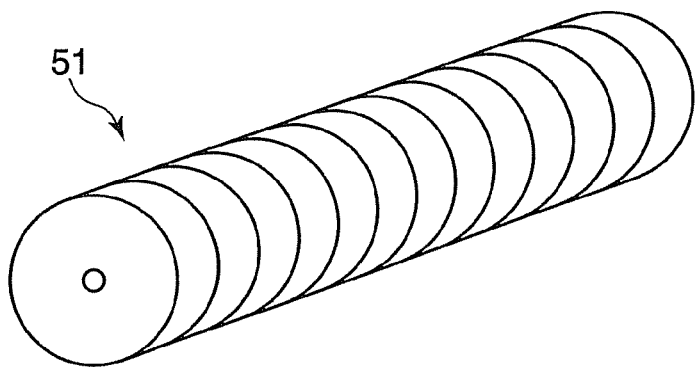
FIG. 18A is a perspective view of one embodiment of a mold for molding a total reflection linear Fresnel lens part and FIG. 18B is a perspective view of one embodiment of a mold for molding a linear prism lens part.
Figure 18B:
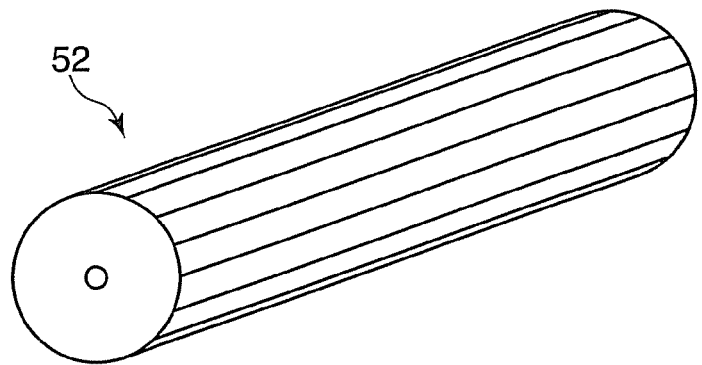

FIG. 18 (*a*) shows a mold having a prism shape formed in the circumferential direction of a roll mold. The mold may be a mold 51 for molding a total reflection linear Fresnel lens part comprising prisms that has a total reflection function and arranged in vertical direction. FIG. 18 (*b*) shows a mold having a prism shape formed in an axial direction of a roll mold. The mold may be a mold 52 for molding a linear prism lens part.

Conversely, the total reflection linear Fresnel lens part comprising prisms having a total reflection function arranged in a vertical direction may be in a form shown in FIG. 18 (*b*), and the mold for the linear prism lens part may be a form shown in FIG. 18 (*a*).

Figure 19:
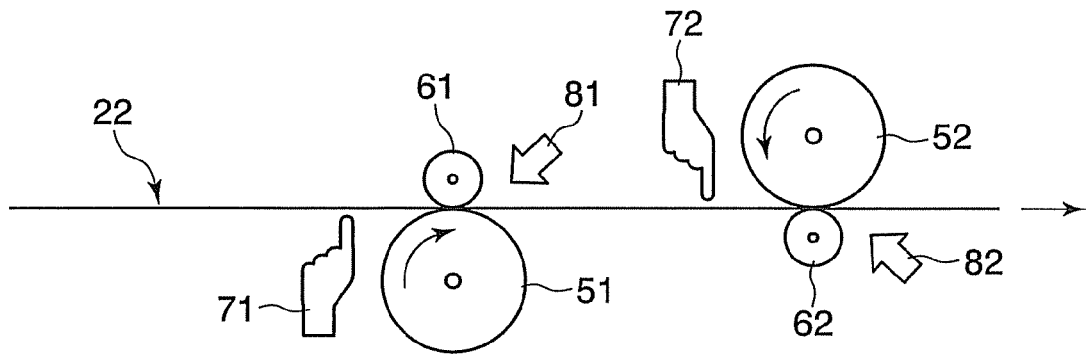
FIG. 19 is a schematic diagram for explaining a part of a method for manufacturing a transmission screen for an interactive board in a second embodiment of the present invention.

FIG. 19 is a schematic diagram showing one embodiment of a method for manufacturing an optical sheet constituting a transmission screen for an interactive board in the second embodiment of the present invention, the optical sheet comprising a transparent base material, a total reflection linear Fresnel lens part disposed on one surface of the transparent base material, and a linear prism lens part disposed on the surface of the transparent base material remote from the total reflection linear Fresnel lens part. At the outset, two types of molds 51, 52 are provided. Next, a transparent base material 22 is continuously supplied into the two molds 51, 52. In this case, before passing the transparent base material 22 into the mold 51, a flowable ionizing radiation curable resin is supplied from a supplying device 71. The ionizing radiation curable resin is allowed to flow into the mold shape between the mold 51 and its backup roll 61 and is cured with an ionizing radiation irradiation device 81, followed by demolding.

The transparent base material 22 is then supplied into the mold 52. In this case, before passing the transparent base material 22 into the mold 52, a flowable ionizing radiation curable resin is supplied from a supplying device 72. The ionizing radiation curable resin is allowed to flow in the mold shape between the mold 52 and its backup roll 62 and is cured with an ionizing radiation irradiation device 82, followed by demolding.

Thus, an optical sheet can be molded that comprises a total reflection linear Fresnel lens part comprising prisms having a total reflection function and arranged in a vertical direction on an incident light side, which is one surface of a transparent base material, and a linear prism lens part comprising prisms that are arranged, on the surface of the transparent base material remote from the total reflection linear Fresnel lens part, in a direction perpendicular to the direction of disposition of the total reflection linear Fresnel lens part. The method according to the present invention can realize in-line continuous production of transmission screens for an interactive board and can provide high-quality transmission screens for an interactive board at low cost.

<Interactive Board>

Figure 20:
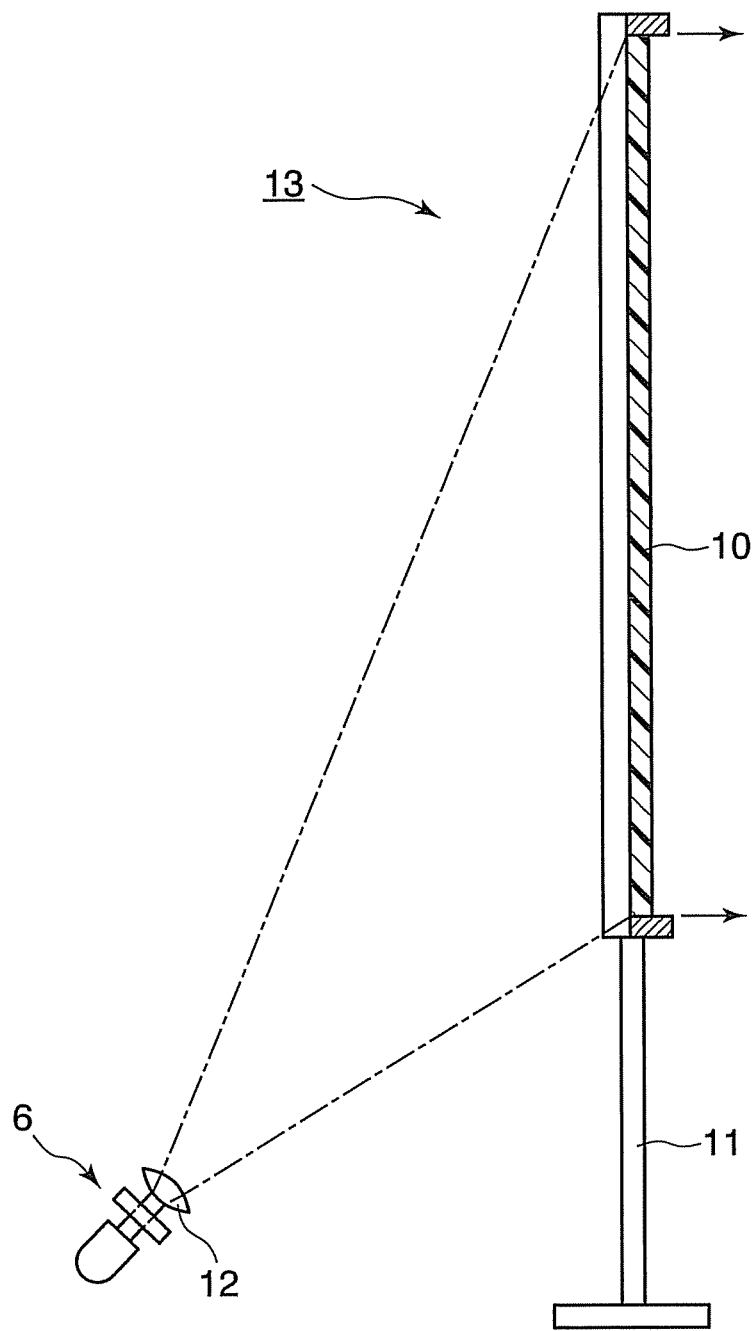
FIG. 20 is a cross-sectional view of an interactive board using a transmission screen according to the present invention.
Figure 21:
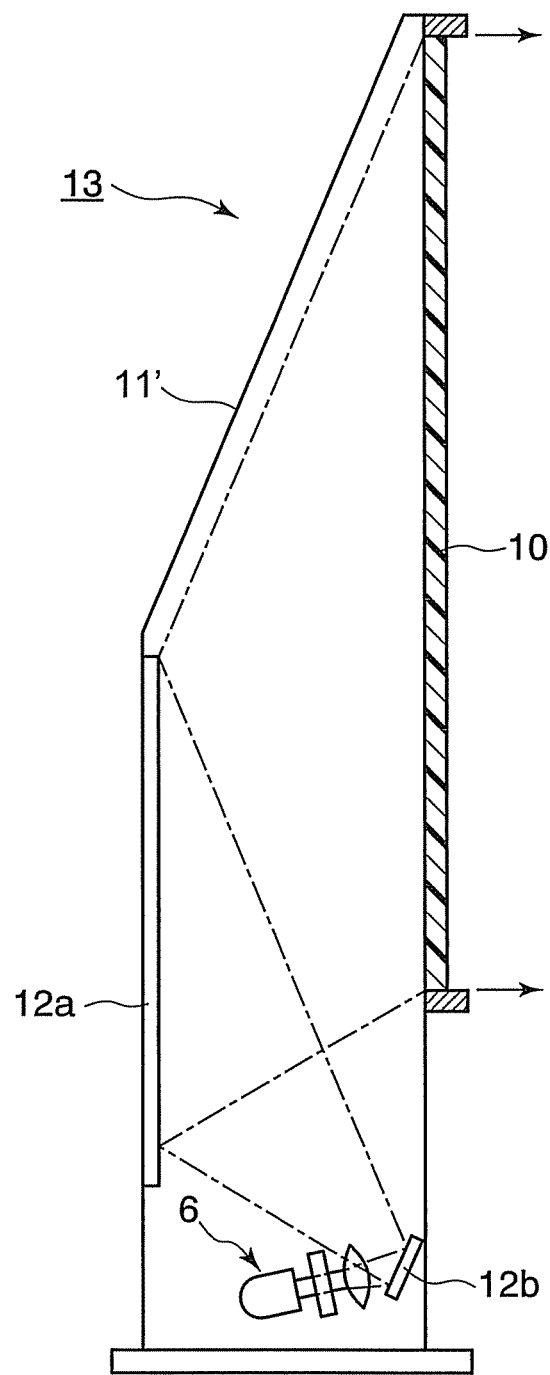
FIG. 21 is a cross-sectional view of an interactive board in another embodiment of the present invention using a transmission screen according to the present invention.

An embodiment where the transmission screen is applied to an interactive board is shown in FIG. 20. An interactive board 13 comprises a screen fixing base 11 and a board (a screen) 10. Image information from a personal computer or the like (not shown) is projected from the back surface of the board (screen) 10 through a lens 12 from a projector 6 and is displayed on the front surface of the board 10. Letters, figures or the like as in the conventional white board can be written on the front surface of the board 10 with a writing instrument or the like. The written letters or figures can also be erased. In the embodiment of the present invention, as shown in FIG. 21, the projector 6 may also be integrated with the screen fixing base 11 and the board (screen) 10. In this case, light projected from the projector is reflected by reflectors 12*b* and 12*a* and is introduced from the back surface side of the board 10.

In an interactive board system comprising at least the interactive board according to the present invention, input means such as a marker or a stylus pen and an image information device such as a personal computer, information can be interactively transmitted between the personal computer and the interactive board. For example, while projecting image information stored in the personal computer on the board, information such as letters or figures written on the board can be transmitted to the personal computer. Accordingly, when the interactive board is used in such a state that a plurality of personal computers are connected to the Internet, information such as letters or figures can be mutually shared even at remote locations. Therefore, a meeting between persons at remote locations can be performed with high efficiency by adopting a combination of the interactive board with a video conference system.

DESCRIPTION OF REFERENCE CHARACTERS

1 Fresnel lens sheet
2, 34 Light diffusing member
3, 35 Hard coat layer
4 Fresnel lens part
5 Adhesive layer
6 Projector
10 Transmission screen
11, 11' Board mounting base
12 Lens
12a, 12b Reflector
20 Diffusing layer
21, 21' Base material
22 Fine particles
23 Light transparent part in horizontal direction view angle widening member
24 Light absorbing part in horizontal direction view angle widening member
25 Base material in horizontal direction view angle widening member
26 Light transparent resin
27 Colored particles
31 Total reflection linear Fresnel lens part
32 Transparent base material
33 Linear prism lens part
51, 52 Mold
61, 62 Backup roll
71, 72 Ionizing radiation curable resin supplying device
81, 82 Ionizing radiation irradiation device

The invention claimed is:

1. A transmission screen for an interactive board, the transmission screen comprising: a Fresnel lens sheet having a prism part on its incident light side; a light diffusing member provided on the Fresnel lens on its surface side remote from the prism part; and a hard coat layer provided on the outgoing light side of the light diffusing member,
wherein the Fresnel lens sheet is laminated directly onto the light diffusing member through an adhesive layer and the light diffusing member is laminated onto the hard coat layer through an adhesive layer, and
wherein a positional information detection means is provided on the outgoing light side of the hard coat layer.

2. The transmission screen for an interactive board according to claim 1, wherein the Fresnel lens sheet comprises a refractive Fresnel lens, a total reflection Fresnel lens, or a combination of the refractive Fresnel lens with the total reflection Fresnel lens.

3. The transmission screen for an interactive board according to claim 1, wherein the Fresnel lens sheet comprises a circular Fresnel lens or a linear Fresnel lens.

4. An interactive board comprising a transmission screen according to claim 1.

5. An interactive board system comprising an interactive board according to claim 4.

6. A transmission screen for an interactive board, the transmission screen comprising:

a total reflection linear Fresnel lens part comprising prisms that are arranged on an incident light side as one surface of the transparent base material, have a total reflection function, and are arranged next to each other in a vertical direction;
a linear prism lens part comprising prisms that are arranged on the transparent base material on its surface side remote from the total reflection linear Fresnel lens part and are arranged next to each other in a direction perpendicular to the direction in which the total reflection linear Fresnel lens part is disposed;
a light diffusing member provided on the outgoing light side of the linear prism lens part; and
a hard coat layer provided on the outgoing light side of the light diffusing member,
wherein the light diffusing member is laminated onto the hard coat layer through an adhesive layer, and
wherein a positional information detection means is provided on the outgoing light side of the hard coat layer.

7. The transmission screen for an interactive board according to claim 6, wherein the linear prism lens part is integrated with the light diffusing member.

8. The transmission screen for an interactive board according to claim 7, wherein at least a part of the front end of the linear prism lens part is flattened in a direction parallel to the transparent base material and is integrated with the light diffusing member.

9. A method for manufacturing a transmission screen for an interactive board according to claim 6, the method comprising the steps of:
a) providing a mold for molding the total reflection linear Fresnel lens part comprising prisms that have a total reflection function and are arranged next to each other in a vertical direction;
b) providing a mold for molding the linear prism lens part;
c) continuously supplying a transparent base material into the two molds, supplying an ionizing radiation curable resin into between the transparent base material and the two molds, irradiating the ionizing radiation curable resin with an ionizing radiation to cure the ionizing radiation curable resin, and separating a molded product from the two molds to form the total reflection linear Fresnel lens part and the linear prism lens part on each side of the transparent base material; and
d) laminating the light diffusing member and the hard coat layer onto a side of the linear prism lens part opposite to the transparent base material.

10. An interactive board comprising a transmission screen according to claim 6.

11. A transmission screen for an interactive board, the transmission screen comprising: a Fresnel lens sheet having a prism part on its incident light side; a light diffusing member provided on the Fresnel lens on its surface side remote from the prism part; and a hard coat layer provided on the outgoing light side of the light diffusing member,
wherein the Fresnel lens is provided directly on one surface of the light diffusing member, and the light diffusing member is laminated onto the hard coat later through an adhesive layer, and
wherein a positional information detection means is provided on the outgoing light side of the hard coat layer.

12. The transmission screen for an interactive board according to claim 11, wherein the Fresnel lens sheet comprises a refractive Fresnel lens, a total reflection Fresnel lens, or a combination of the refractive Fresnel lens with the total reflection Fresnel lens.

13. The transmission screen for an interactive board according to claim 11, wherein the Fresnel lens sheet comprises a circular Fresnel lens or a linear Fresnel lens.

14. An interactive board comprising a transmission screen according to claim 11.

15. A transmission screen for an interactive board, the transmission screen comprising: a Fresnel lens sheet having a prism part on its incident light side; a light diffusing member provided on the Fresnel lens on its surface side remote from the prism part; and a hard coat layer provided on the outgoing light side of the light diffusing member,
wherein the Fresnel lens sheet is laminated directly onto the light diffusing member through an adhesive layer and the hard coat layer is provided directly on one surface of the light diffusing member, and
wherein a positional information detection means is provided on the outgoing light side of the hard coat layer.

16. The transmission screen for an interactive board according to claim 15, wherein the Fresnel lens sheet comprises a refractive Fresnel lens, a total reflection Fresnel lens, or a combination of the refractive Fresnel lens with the total reflection Fresnel lens.

17. The transmission screen for an interactive board according to claim 15, wherein the Fresnel lens sheet comprises a circular Fresnel lens or a linear Fresnel lens.

18. An interactive board comprising a transmission screen according to claim 15.

19. A transmission screen for an interactive board, the transmission screen comprising: a Fresnel lens sheet having a prism part on its incident light side; a light diffusing member provided on the Fresnel lens on its surface side remote from the prism part; and a hard coat layer provided on the outgoing light side of the light diffusing member,
wherein the Fresnel lens is provided directly on one surface of the light diffusing member, and the hard coat layer is provided directly on one surface of the light diffusing member, and
wherein a positional information detection means is provided on the outgoing light side of the hard coat layer.

20. The transmission screen for an interactive board according to claim 19, wherein the Fresnel lens sheet comprises a refractive Fresnel lens, a total reflection Fresnel lens, or a combination of the refractive Fresnel lens with the total reflection Fresnel lens.

21. The transmission screen for an interactive board according to claim 19, wherein the Fresnel lens sheet comprises a circular Fresnel lens or a linear Fresnel lens.

22. An interactive board comprising a transmission screen according to claim 19.

23. A transmission screen for an interactive board, the transmission screen having a lens part provided on both surfaces of a transparent base material, the transmission screen comprising:
a total reflection linear Fresnel lens part comprising prisms that are arranged on an incident light side as one surface of the transparent base material, have a total reflection function, and are arranged next to each other in a vertical direction;
a linear prism lens part comprising prisms that are arranged on the transparent base material on its surface side remote from the total reflection linear Fresnel lens part and are arranged next to each other in a direction perpendicular to the direction in which the total reflection linear Fresnel lens part is disposed;
a light diffusing member provided on the outgoing light side of the linear prism lens part; and
a hard coat layer provided on the outgoing light side of the light diffusing member,
wherein the hard coat layer is provided directly on one surface of the light diffusing member, and
wherein a positional information detection means is provided on the outgoing light side of the hard coat layer.

24. The transmission screen for an interactive board according to claim 23, wherein the linear prism lens part is integrated with the light diffusing member.

25. An interactive board comprising a transmission screen according to claim 23.

26. A method for manufacturing a transmission screen for an interactive board, the method comprising the steps of:
a) providing a mold for molding a total reflection linear Fresnel lens part comprising prisms that have a total reflection function and are arranged next to each other in a vertical direction;
b) providing a mold for molding a linear prism lens part, the linear prism lens part comprising prisms that are arranged next to each other in a direction perpendicular to said vertical direction;
c) continuously supplying a transparent base material into the two molds, supplying an ionizing radiation curable resin into between the transparent base material and the two molds, irradiating the ionizing radiation curable resin with an ionizing radiation to cure the ionizing radiation curable resin, and separating a molded product from the two molds to form the total reflection linear Fresnel lens part on an incident light side of the transparent base material and the linear prism lens part on an opposed side of the transparent base material; and
d) laminating a light diffusing member on an outgoing light side of the linear prism lens part; and
e) laminating a hard coat layer directly on one surface of the light diffusing member on the outgoing light side of the linear prism lens part that is a side of the linear prism lens part opposite to the transparent base material.

* * * * *